United States Patent
Yahagi et al.

(10) Patent No.: US 9,774,841 B2
(45) Date of Patent: Sep. 26, 2017

(54) STEREOSCOPIC IMAGE CAPTURE DEVICE AND CONTROL METHOD OF THE SAME

(71) Applicant: FUJIFILM Corporation, Tokyo (JP)

(72) Inventors: Koichi Yahagi, Saitama (JP); Koichi Tanaka, Saitama (JP); Hisashi Endo, Saitama (JP); Tetsu Wada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 911 days.

(21) Appl. No.: 13/706,437

(22) Filed: Dec. 6, 2012

(65) Prior Publication Data

US 2013/0093847 A1 Apr. 18, 2013

Related U.S. Application Data

(63) Continuation-in-part of application No. PCT/JP2011/063793, filed on Jun. 16, 2011.

(30) Foreign Application Priority Data

Jun. 28, 2010 (JP) .................................. 2010-145728
Jan. 18, 2011 (JP) .................................. 2011-007406

(51) Int. Cl.
*H04N 13/02* (2006.01)
*H04N 5/77* (2006.01)
*H04N 13/00* (2006.01)

(52) U.S. Cl.
CPC ..... *H04N 13/0203* (2013.01); *H04N 13/0221* (2013.01); *H04N 13/0296* (2013.01); *H04N 5/772* (2013.01); *H04N 2013/0081* (2013.01)

(58) Field of Classification Search
CPC ........... H04N 13/0203; H04N 13/0296; H04N 13/0221; H04N 5/772; H04N 2013/0081

USPC .......................................................... 348/43
See application file for complete search history.

(56) References Cited

U.S. PATENT DOCUMENTS

2001/0014171 A1    8/2001  Iijima et al.
2008/0137934 A1*   6/2008  Sakaguchi ........... A61B 6/4441
                                                382/132

FOREIGN PATENT DOCUMENTS

| JP | 10-023465 A   | 1/1998 |
| JP | 10-066106 A   | 3/1998 |
| JP | 10-155110 A   | 6/1998 |
| JP | 2003-69879 A  | 3/2003 |
| JP | 2006-013851 A | 1/2006 |

(Continued)

*Primary Examiner* — Gims Philippe
*Assistant Examiner* — On S Mung
(74) *Attorney, Agent, or Firm* — Birch, Stewart, Kolasch & Birch, LLP

(57) ABSTRACT

An image for a left eye and an image for a right eye are respectively captured. A corresponding point corresponding to each of a plurality of feature points detected from the image for a left eye is searched for using the image for a right eye. The number of corresponding points found by the search is counted, and it is determined whether to be equal to or more than a predetermined ratio with respect to the number of pixels of the image for a right eye. When the number of corresponding points is determined to be less than the predetermined ratio, the image for a right eye is recaptured, and the corresponding point search process and the determination of whether the number of corresponding points is equal to or more than the predetermined ratio are re-executed using an image new for a right eye obtained by recapture.

20 Claims, 24 Drawing Sheets

(56) References Cited

FOREIGN PATENT DOCUMENTS

| JP | 2006013851 A | * | 1/2006 |
|----|--------------|---|--------|
| JP | 2006-113807 A | | 4/2006 |
| JP | 2009-064193 A | | 3/2009 |
| JP | 2009-212728 A | | 9/2009 |

* cited by examiner

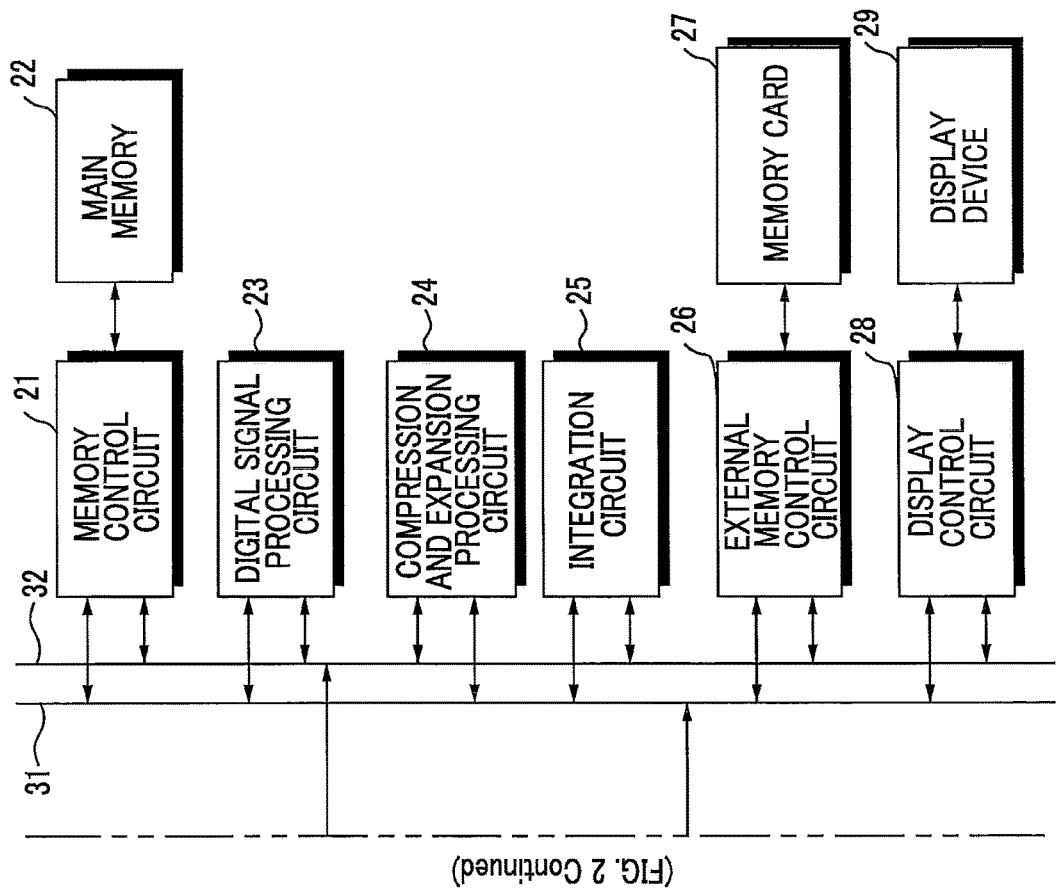
(FIG. 2 Continued)

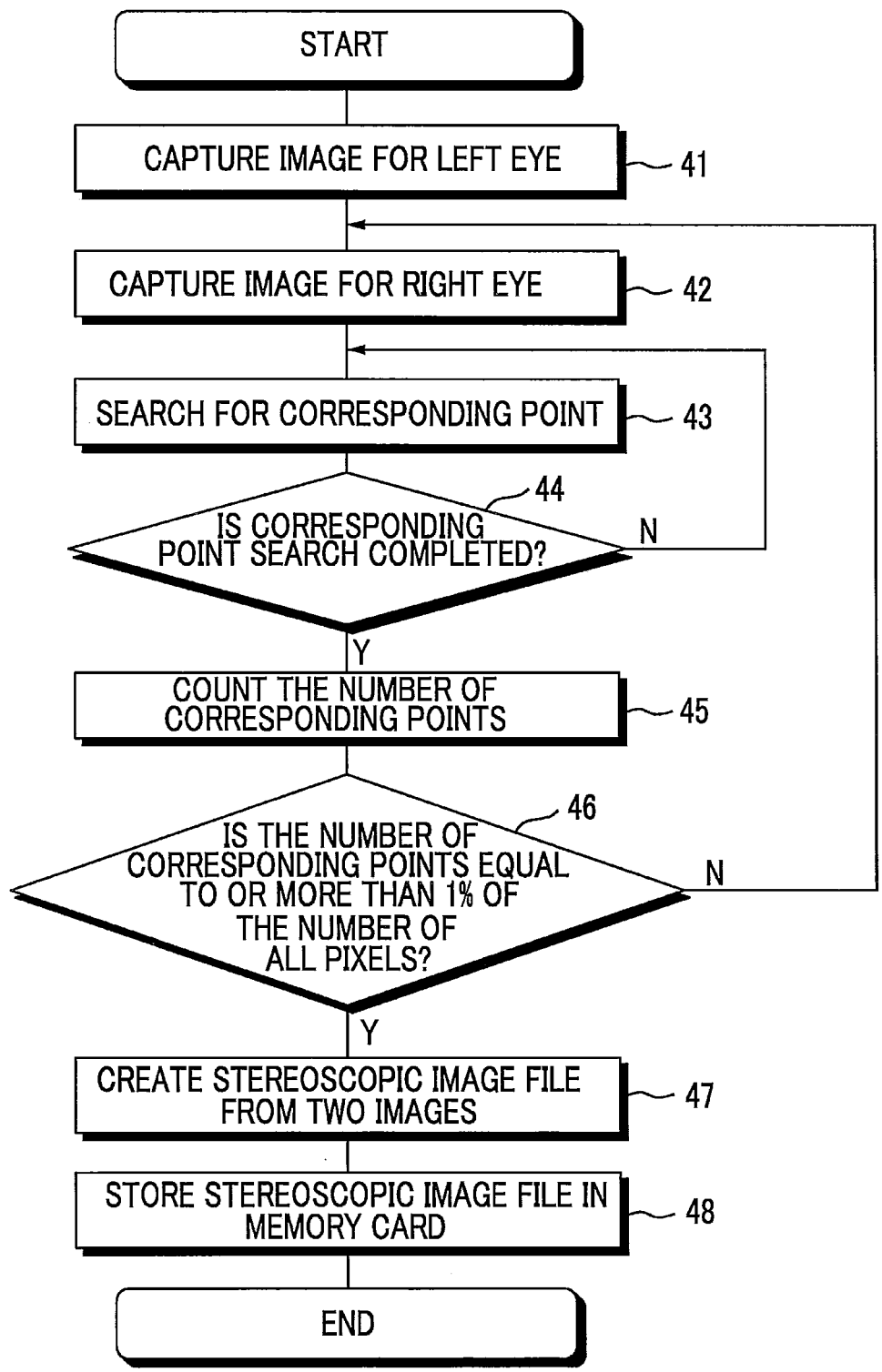

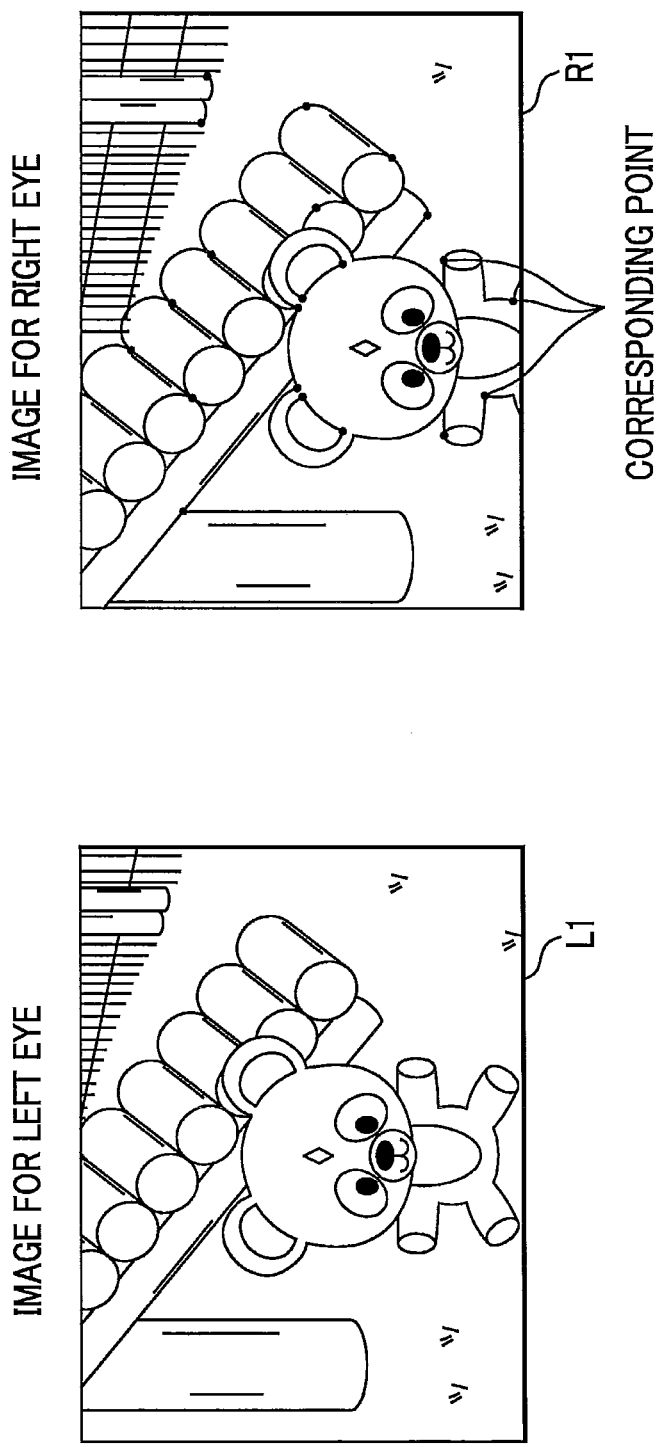

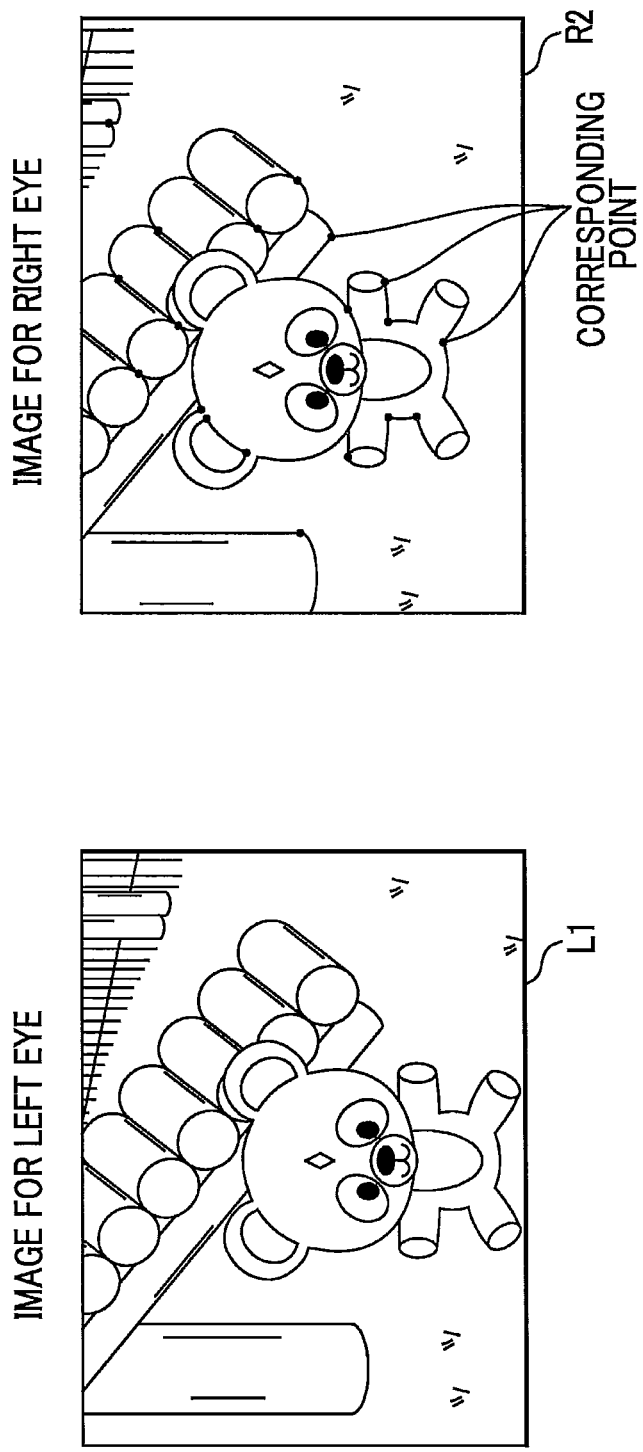

FIG. 6
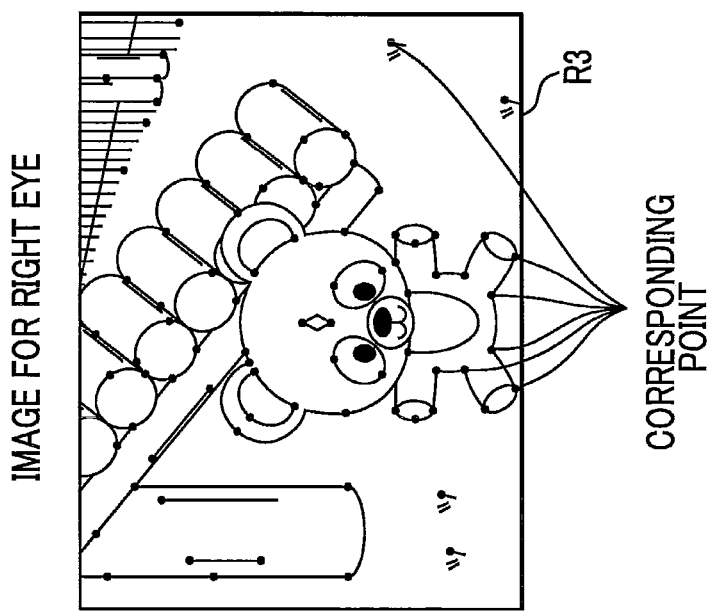
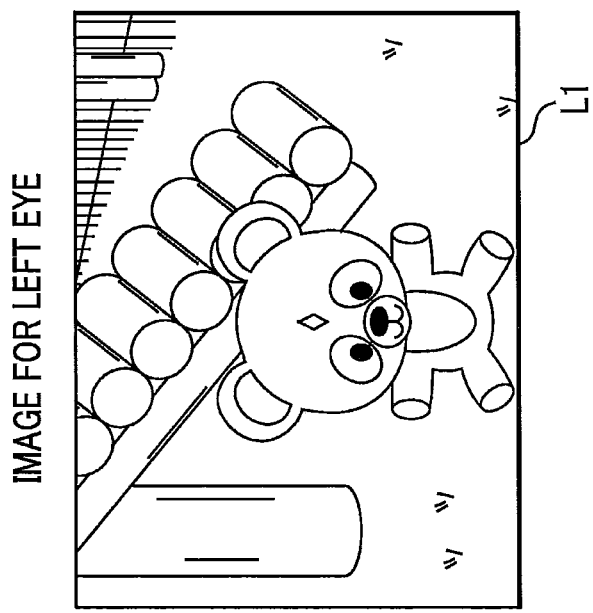

FIG. 10
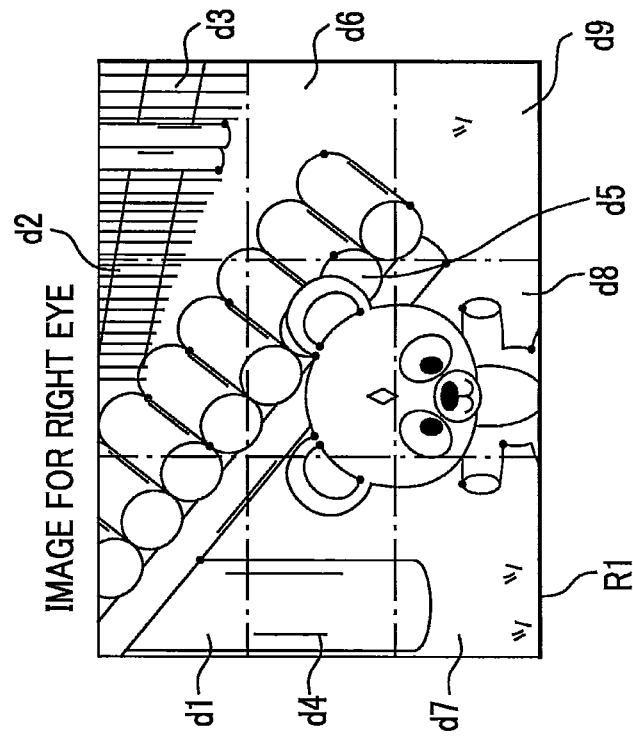
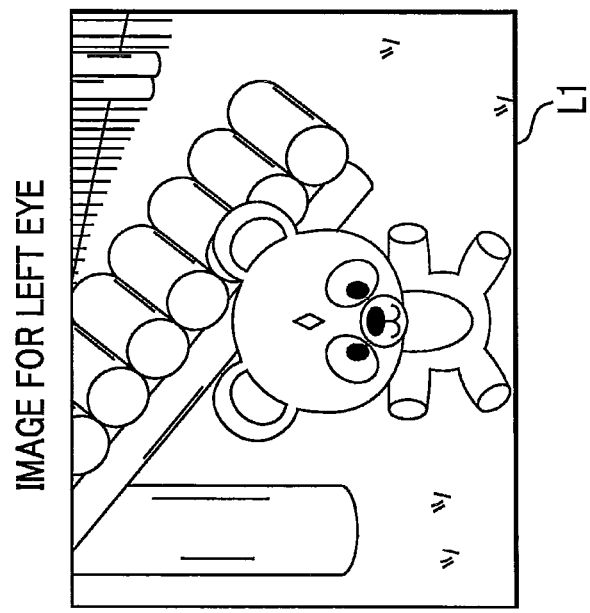

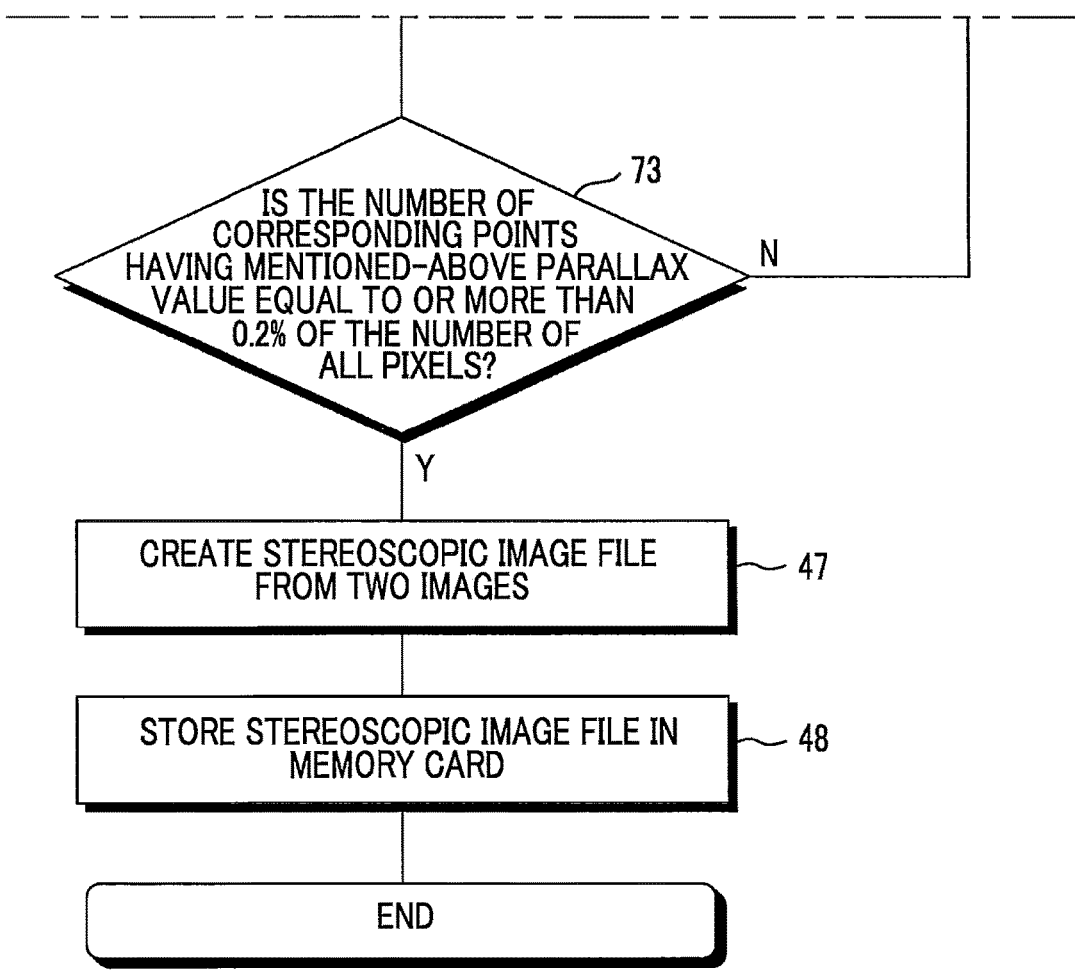

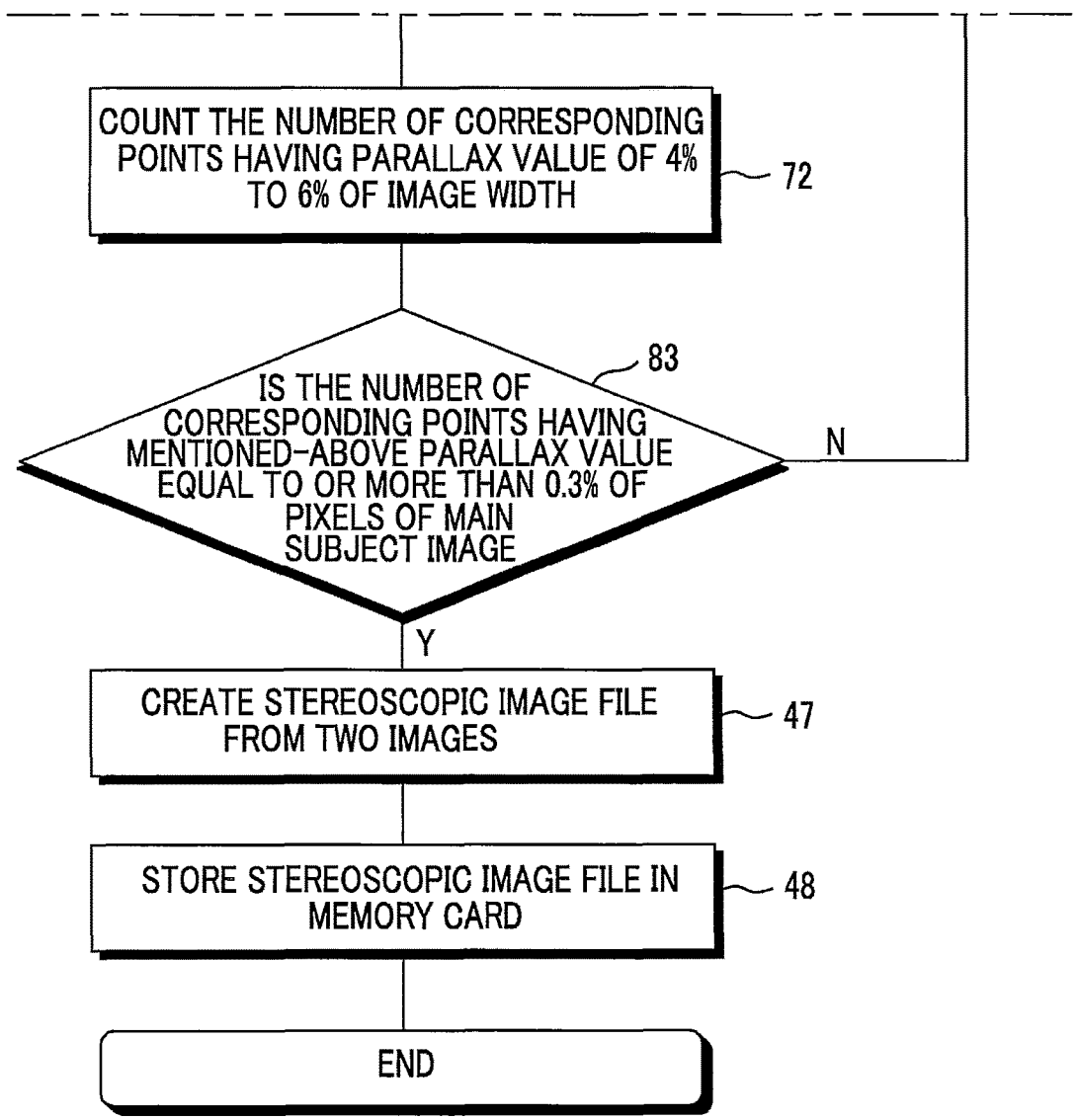

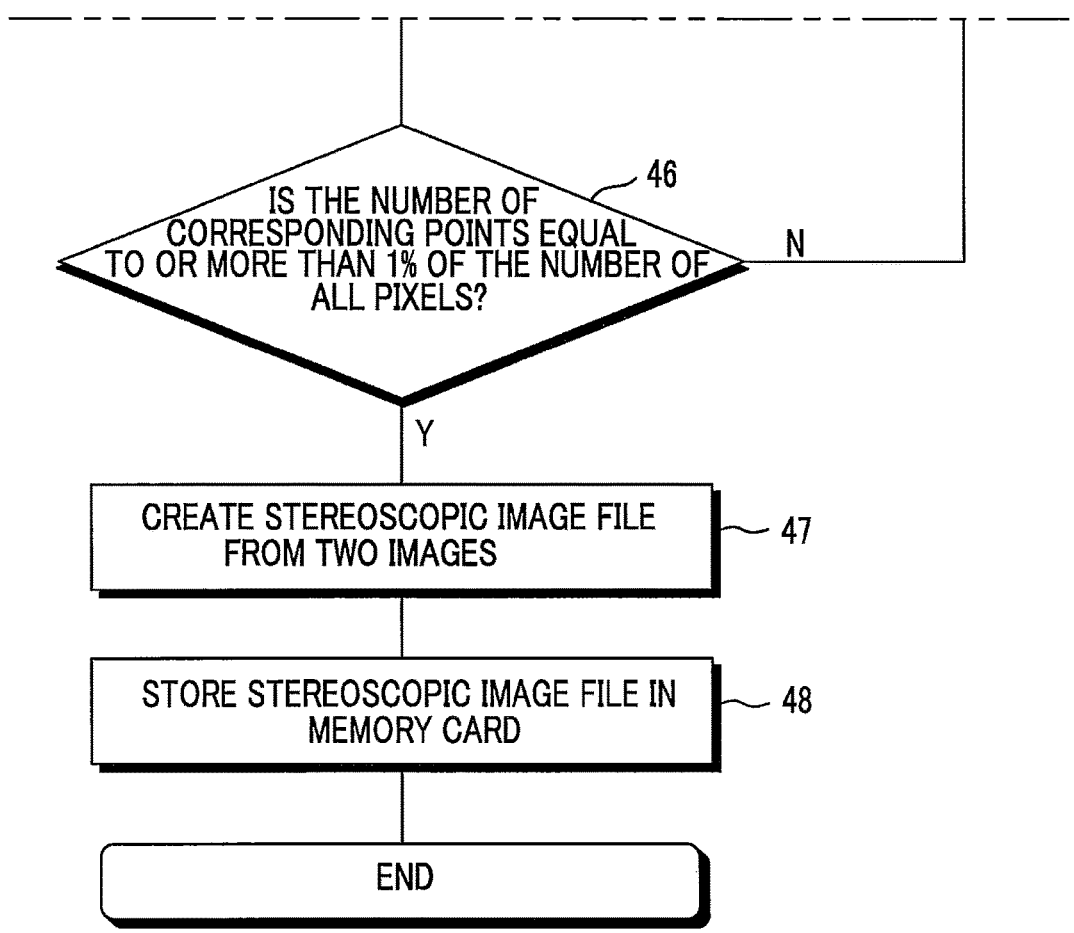

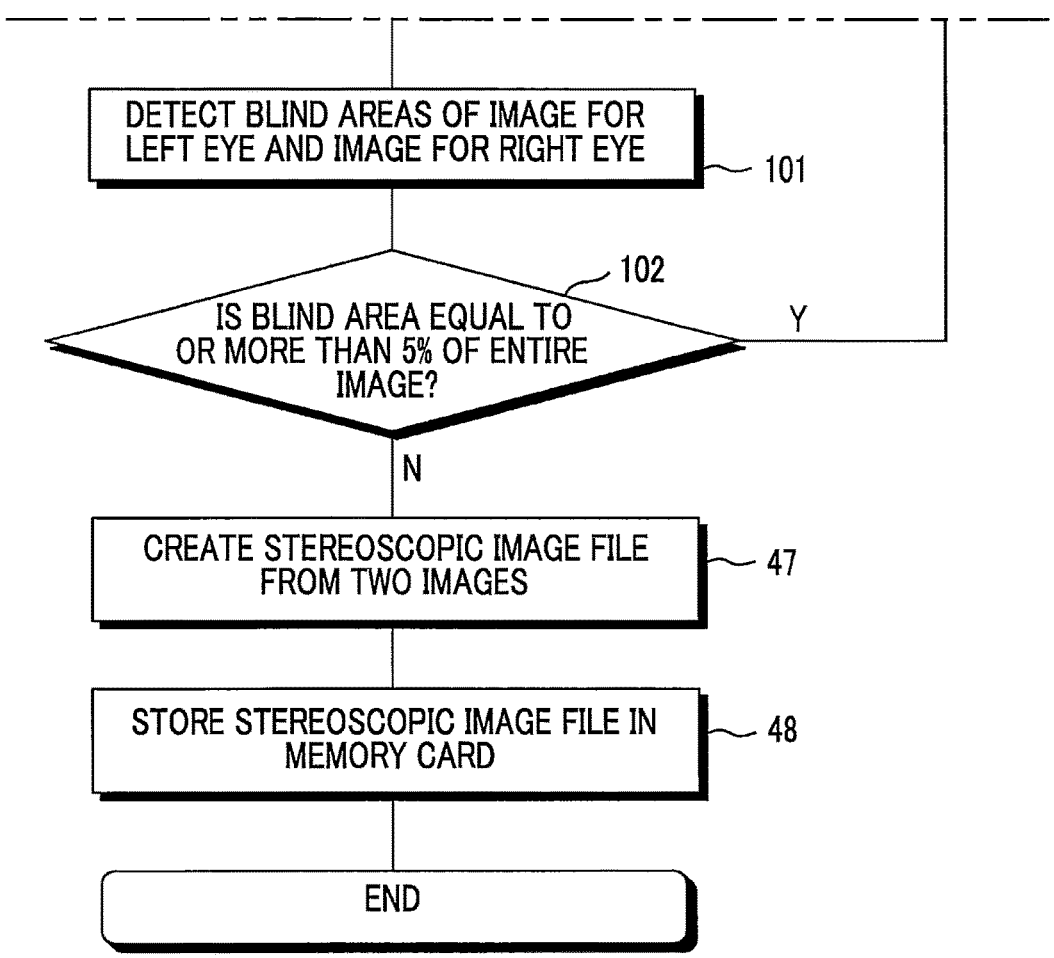

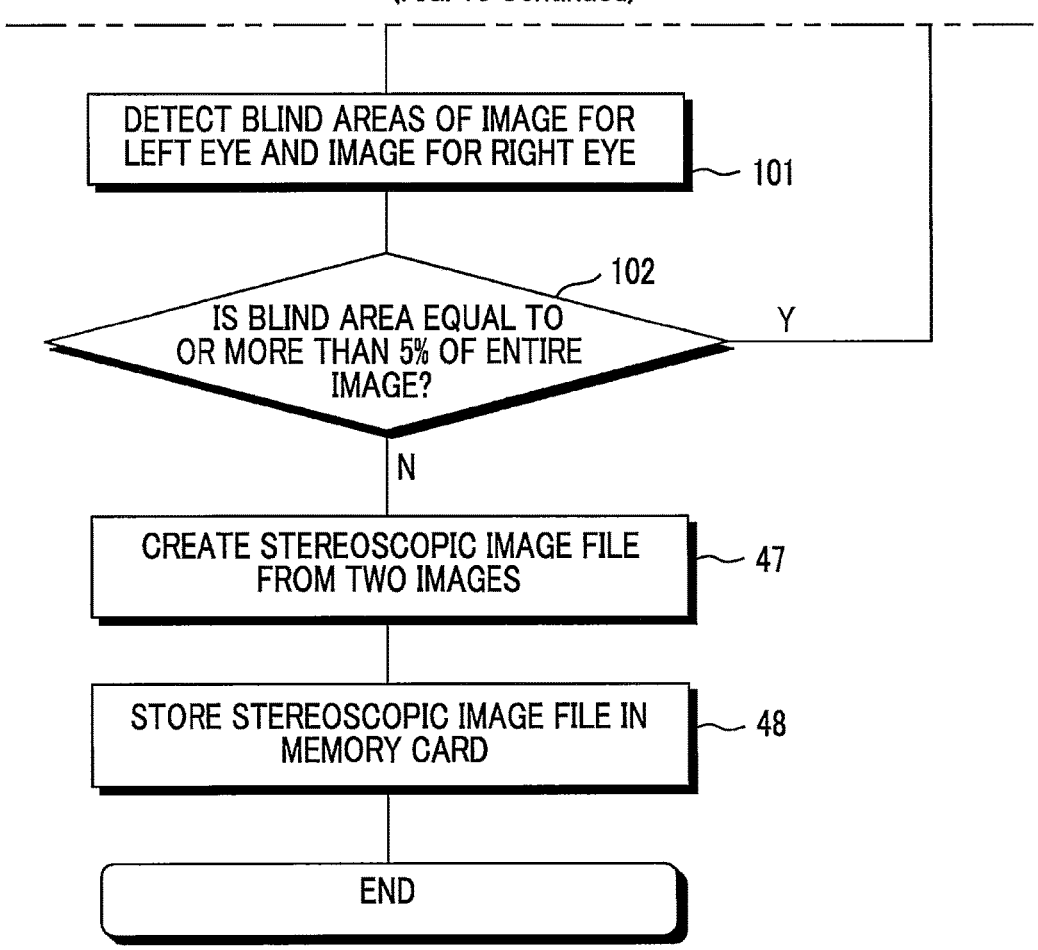

STEREOSCOPIC IMAGE CAPTURE DEVICE AND CONTROL METHOD OF THE SAME

This application is a Continuation-in-Part of PCT International Application No. PCT/JP2011/063793 filed on Jun. 16, 2011, which claims priority under 35 U.S.C §119(a) to Patent Application No. 2010-145728 filed in Japan on Jun. 28, 2010 and Patent Application No. 2011-007406 filed in Japan on Jan. 18, 2011, all of which are hereby expressly incorporated by reference into the present application.

BACKGROUND OF THE INVENTION

1. Field of the Invention

The present invention relates to a stereoscopic image capture device and a control method of the same.

2. Description of the Related Art

JP2006-113807A discloses a technique for performing the association of feature points between adjacent images with respect to a large number of image groups (first image group) obtained while a camera is moved, and obtaining an image group (second image group) having a constant viewpoint interval from the first image group using association information of the feature points. A stereoscopic image is formed by the second image group.

SUMMARY OF THE INVENTION

However, when the number of feature points associated between adjacent images is small, even in the case where the viewpoint interval is constant, there is a concern that a sense of discomfort occurs in stereoscopic viewing.

The present invention aims at being capable of simply obtaining an image suitable for stereoscopic viewing.

According to the present invention, there is provided a stereoscopic image capture device which includes imaging part for imaging a subject to output image data obtained by imaging, and generates a stereoscopic image file from image data indicating a subject image from a viewpoint for a left eye and a viewpoint for a right eye which are output from the imaging part, including: corresponding point search part for searching for a corresponding point corresponding to each of a plurality of feature points detected using first image data obtained from one reference viewpoint of the viewpoint for a left eye and the viewpoint for a right eye, using second image data obtained from the other viewpoint of the viewpoint for a left eye and the viewpoint for a right eye which is different from the reference viewpoint; corresponding point number determination part for determining whether the number of corresponding points found by the search using the corresponding point search part is equal to or more than a first threshold; control part for controlling the corresponding point search part and the corresponding point number determination part for re-executing the corresponding point search and the corresponding point number determination, using second new image data obtained by follow-up imaging from a viewpoint different from the reference viewpoint, when the number of corresponding points is determined to be less than the first threshold by the corresponding point number determination part; and stereoscopic image file creation part for creating a stereoscopic image file, using the first image data and the second image data when the number of corresponding points is determined to be equal to or more than the first threshold by the corresponding point number determination part. The first threshold may be the number which is set in advance, and may be the number which is set by a ratio to the number of pixels constituting a second image represented by the second image data.

According to the present invention, there is provided a method of controlling a stereoscopic image capture device which includes imaging part for imaging a subject to output image data obtained by imaging, and generates a stereoscopic image file from image data indicating a subject image from a viewpoint for a left eye and a viewpoint for a right eye which are output from the imaging part, including: causing corresponding point search part to search for a corresponding point corresponding to each of a plurality of feature points detected using first image data obtained from one reference viewpoint of the viewpoint for a left eye and the viewpoint for a right eye, using second image data obtained from the other viewpoint of the viewpoint for a left eye and the viewpoint for a right eye which is different from the reference viewpoint; causing corresponding point number determination part to determine whether the number of corresponding points found by the search using the corresponding point search part is equal to or more than a first threshold; causing control part to control the corresponding point search part and the corresponding point number determination part so as to re-execute the corresponding point search and the corresponding point number determination, using second new image data obtained by follow-up imaging from a viewpoint different from the reference viewpoint, when the number of corresponding points is determined to be less than the first threshold by the corresponding point number determination part; and causing stereoscopic image file creation part to create a stereoscopic image file, using the first image data and the second image data when the number of corresponding points is determined to be equal to or more than the first threshold by the corresponding point number determination part.

The first image obtained from the reference viewpoint (for example, viewpoint for a left eye) and the second image obtained from the viewpoint (for example, viewpoint for a right eye) different from the reference viewpoint are used, and the corresponding point corresponding to the feature point detected from the first image is searched for from the second image. When the number of corresponding points found by the search is equal to or more than the first threshold, a stereoscopic image file is created from the first image data indicating the first image and the second image data indicating the second image. On the other hand, when the number of corresponding points is less than the first threshold, second new image data obtained by follow-up imaging is used, and the corresponding point search and the determination of whether the number of corresponding points found by the search is equal to or more than the first threshold are re-executed.

Both the second image data and the second new image data are commonly image data obtained by imaging (capturing an image of) the subject from the viewpoint (for example, viewpoint for a right eye) different from the reference viewpoint, but mean different image data since the image capture timings thereof are different from each other. When the number of corresponding points is determined to be less than the first threshold, image data which is then obtained by recapturing the subject from the viewpoint different from the reference viewpoint may be used as the second new image data, and one second image data selected from among a plurality of second image data from the viewpoint different from the reference viewpoint obtained in advance by multiple times of imaging may be used as the second new image data.

According to the present invention, the stereoscopic image file is created by the first image and the second image including many corresponding point corresponding to the feature points detected from the first image. Since the stereoscopic image file is created from the first image and the second image in which the viewpoints are different from each other and the compositions are relatively consistent with each other, it is possible to obtain a stereoscopic image suitable for stereoscopic viewing.

Imaging from the viewpoint different from the reference viewpoint, the corresponding point search and the corresponding point number determination may be repeated until the second image data having the number of corresponding points equal to or more than the first threshold is obtained (until the number of corresponding points found by the search using the corresponding point search part is determined to be equal to or more than the first threshold by the corresponding point number determination part).

Preferably, threshold reduction part for reducing the first threshold is further included when the second image data having the number of corresponding points equal to or more than the first threshold is not acquired at a point in time in which a predetermined number of determination processes using the corresponding point number determination part or multiple times of determination processes using the corresponding point number determination part within a predetermined time are terminated. It is possible to avoid the situation in which the stereoscopic image file is not created over a long period of time.

In an embodiment, parallax value calculation part for calculating a parallax value between the feature point and the corresponding point for each corresponding point found by the search using the corresponding point search part is further included, and the corresponding point number determination part determines whether the number of corresponding points having a predetermined parallax value in the corresponding points found by the search using the corresponding point search part is equal to or more than a second threshold. In this case, the corresponding point number determination part proceeds to the creation of the stereoscopic image file, when the number of corresponding points having the predetermined parallax value is determined to be equal to or more than a second threshold, and proceeds to re-execution of the corresponding point search and the corresponding point number determination using second new image data, when the number of corresponding points having the predetermined parallax value is determined to be less than the second threshold. Since a set of first image and second image having a parallax value (predetermined parallax value) suitable for stereoscopic viewing are formed as a stereoscopic image file, it is possible to obtain a stereoscopic image file facilitating stereoscopic viewing. The second threshold may also be the number which is set in advance, and may be the number which is set by a ratio to the number of pixels constituting the second image represented by the second image data.

In another embodiment, the corresponding point number determination part further determines whether the number of corresponding points having a parallax value equal to or more than a limit parallax value in the corresponding points found by the search using the corresponding point number search part is less than a third threshold. In this case, the corresponding point number determination part proceeds to the creation of the stereoscopic image file, when it is determined that the number of corresponding points having the predetermined parallax value is equal to or more than the second threshold, and the number of corresponding points having a parallax value equal to or more than the limit parallax value is less than the third threshold, and proceeds to the re-execution of the corresponding point search and the corresponding point number determination using the second new image data, when it is determined that the number of corresponding points having the predetermined parallax value is less than the second threshold or the number of corresponding points having a parallax value equal to or more than the limit parallax value is equal to or more than the third threshold. The corresponding point number determination part can proceed to a process using second new image data when the corresponding points having an excessively large parallax value (parallax value equal to or more than a limit parallax value) (parallax value unsuitable for stereoscopic viewing) in the second image are found to be equal to or more than a predetermined number (third threshold). The third threshold may also be the number which is set in advance, and may be the number which is set by a ratio to the number of pixels constituting the second image represented by the second image data.

The parallax value calculation part may calculate the parallax value for each corresponding point by subtracting a coordinate value of the corresponding point corresponding to the feature point from a coordinate value of the feature point, and the corresponding point number determination part may use, in precedence, either of the corresponding point of which a positive parallax value is calculated or the corresponding point of which a negative parallax value is calculated. It is possible to obtain a stereoscopic image file indicating a stereoscopic image in which either of a sense of depth or a sense of protrusion is emphasized.

Preferably, area division part for dividing the second image represented by the second image data used in the corresponding point search using the corresponding point search part into a plurality of areas is further included, and the corresponding point number determination part determines whether the number of corresponding points contained in each of the plurality of divided areas divided by the area division part is equal to or more than a fourth threshold. Since the second image in which a large number of corresponding points are present throughout the entire image is selected as an image constituting a stereoscopic image file, it is possible to obtain a stereoscopic image file stereoscopically visible throughout the entire image. The fourth threshold may also be the number which is set in advance, and may be the number which is set by a ratio to the number of pixels constituting the divided area.

In another embodiment, image flat area detection part for detecting an image flat area having a small change in luminance or a color is further included, and the corresponding point search part sets remaining image areas except the image flat area detected by the image flat area detection part to a range of the corresponding point search. It is possible to achieve the efficiency of the corresponding point search process by excluding the image flat area, in which the corresponding point is not likely to be searched for, from the corresponding point search range. Meanwhile, the term "image flat area" herein means an area of which the edge or the contour is not detected within an image and in which the feature point is not present.

Further, the remaining image areas except a predetermined area of the right and left ends of the second image may be set to a range of the corresponding point search. It is possible to achieve the efficiency of the corresponding point search process by excluding the right and right ends of the image having a small overlap of the image portions from the corresponding point search range.

The stereoscopic image capture device may use image data obtained by moving image capture as the first image data and the second image data.

Blind area determination part may be further included, which determines whether a size of at least one blind area of a first blind area which is contained in a second subject image represented by the second image data but is not contained in a first subject image represented by the first image data and a second blind area which is contained in the first subject image but is not contained in the second subject image is equal to or more than a fifth threshold. In this case, the control part, for example, controls the corresponding point search part and the corresponding point number determination part so as to re-execute the corresponding point search and the corresponding point number determination, using second new image data obtained by follow-up imaging from the viewpoint different from the reference viewpoint when the size of at least one blind area of the first blind area and the second blind area is determined to be equal to or more than the fifth threshold by the blind area determination part, and the stereoscopic image file creation part, for example, creates a stereoscopic image file, using the first image data and the second image data when the size of at least one blind area of the first blind area and the second blind area is determined to be less than the fifth threshold by the blind area determination part.

In addition, the corresponding point number determination part may determine whether the number of corresponding points having a predetermined parallax value of which an absolute value is less than a sixth threshold, except a value of which an absolute value is equal to or more than the sixth threshold, in the corresponding points found by the corresponding point search part equal to or more than the first threshold.

Further, main subject image detection part for detecting a main subject image from a second subject image represented by the second image data may be further included. In this case, the corresponding point search part, for example, searches for a corresponding point corresponding to each of a plurality of feature points detected using the first image data from the main subject image detected by the main subject image detection part.

BRIEF DESCRIPTION OF THE DRAWINGS

FIG. 3 is a flow diagram illustrating operations of the digital still camera in a first example.

FIG. 4 is a diagram illustrating an image example of an image for a left eye and an image for a right eye.

FIG. 5 is a diagram illustrating an image example of an image for a left eye and an image for a right eye.

FIG. 6 is a diagram illustrating an image example of an image for a left eye and an image for a right eye.

FIG. 10 is a diagram illustrating an image example of an image for a left eye and an image for a right eye.

DESCRIPTION OF THE PREFERRED EMBODIMENTS

First Example

Figure 1:
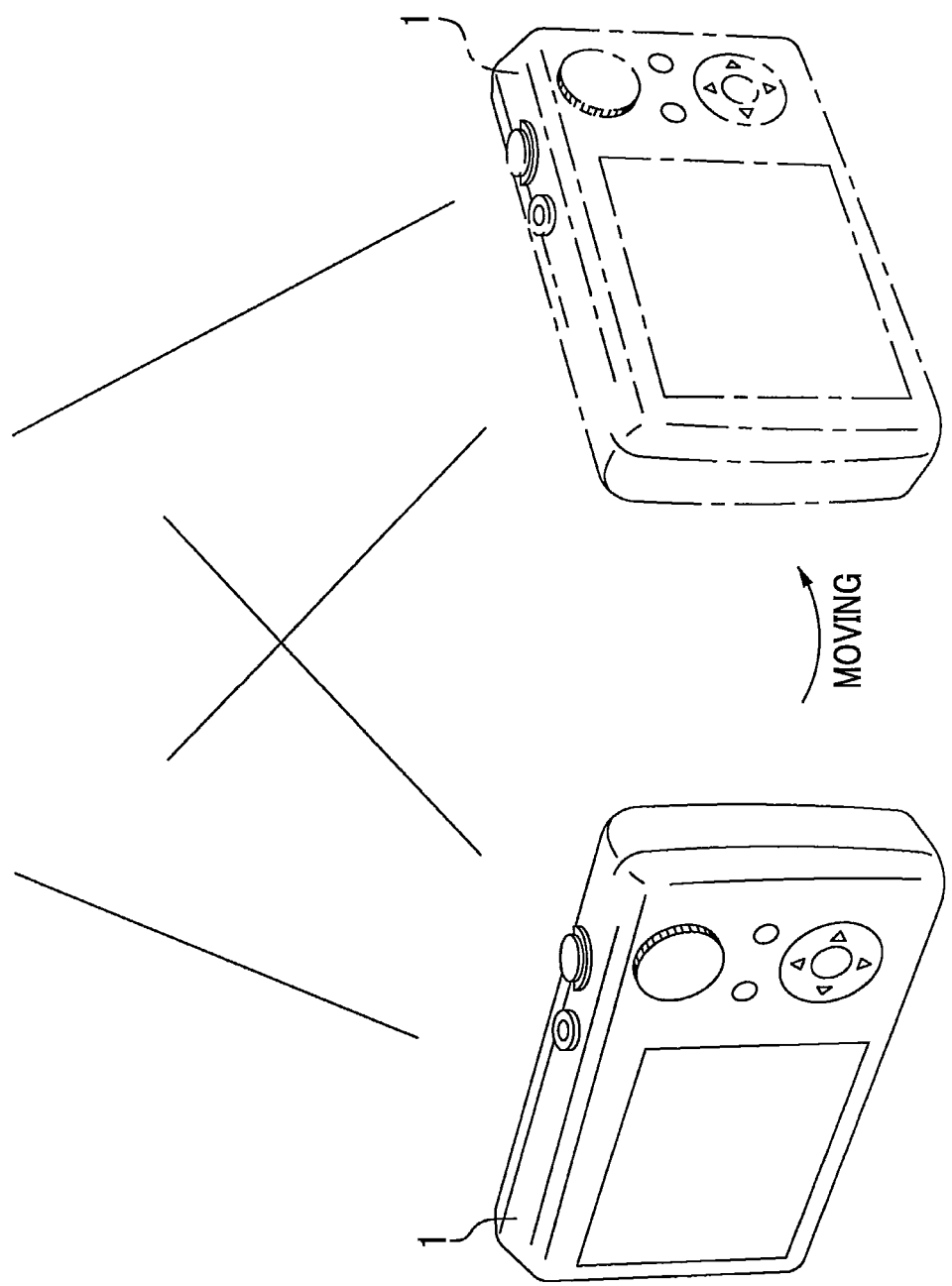
FIG. 1 is a perspective view illustrating a positional relationship of a digital still camera when an image of a subject is captured.

FIG. 1 is a diagram illustrating an example of the present invention, and shows a positional relationship of a digital still camera 1 when an image of a subject is captured.

The digital still camera 1 according to this example obtains a stereoscopically visible image (hereinafter, called a stereoscopic image) from an image obtained by capturing an image of the same subject multiple times. In order to obtain a stereoscopic image, the position (viewpoint) of the digital still camera 1 is moved, and an image of the subject is captured by making the viewpoint different before and after the movement. FIG. 1 shows a positional relationship of the digital still camera 1 when a user performs a first image capture from a viewpoint for a left eye (reference viewpoint) using the digital still camera 1, and then performs a second image capture from a viewpoint for a right eye by moving the camera in the right direction toward the subject. In the following description, an image obtained by image capture before the movement is set to an "image for a left eye", and an image obtained by image capture after the movement is set to an "image for a right eye". Naturally, the image obtained by image capture before the movement may be set to an "image for a right eye", and the image obtained by image capture after the movement may be set to an "image for a left eye". In this case, the movement direction of the user (digital still camera 1) is set to a left direction toward the subject. Even in any of the cases, a stereoscopic image is formed from two images of the image for a left eye and the image for a right eye.

Figure 2:
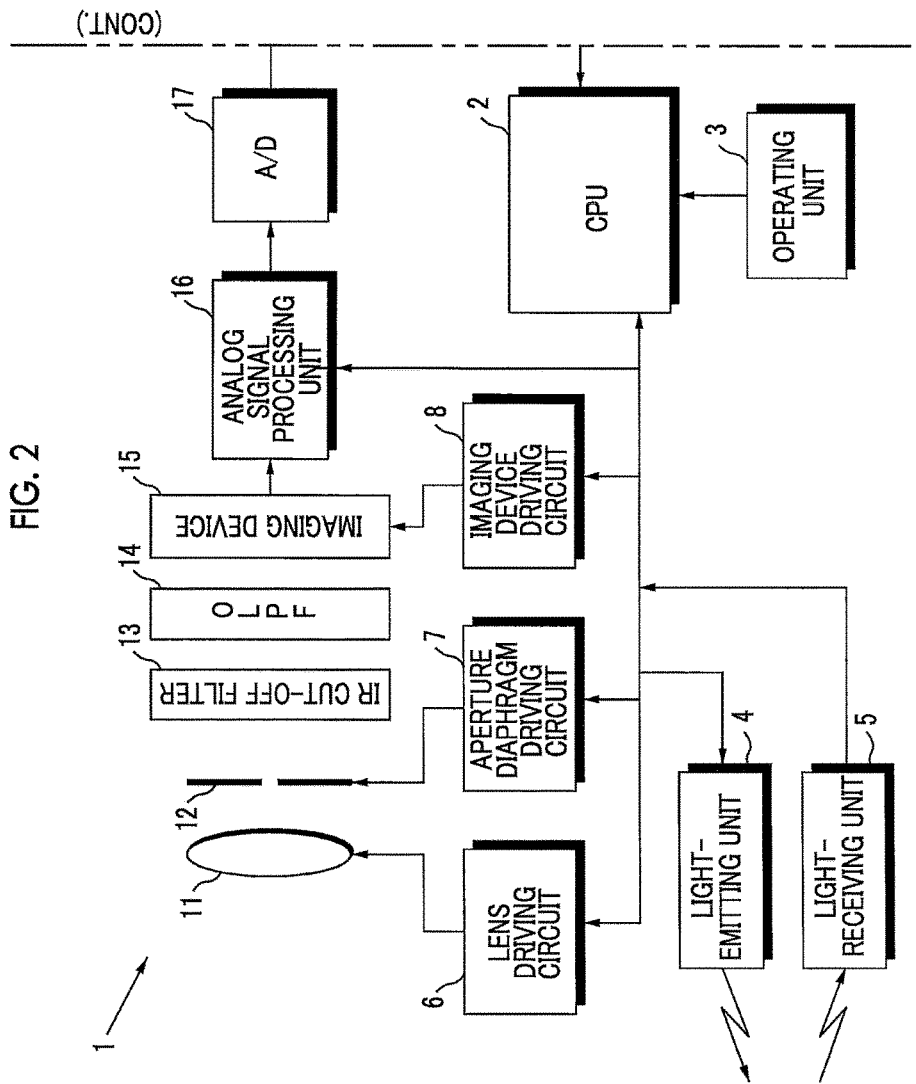
FIG. 2 is a block diagram illustrating an electrical configuration of the digital still camera.

FIG. 2 is a block diagram illustrating an electrical configuration of the digital still camera 1. Meanwhile, the example of the present invention is not limited to a digital still camera (for obtaining a still image), but can be applied to a digital movie camera (for obtaining a moving image).

The overall operation of the digital still camera 1 is supervised by a CPU 2.

The digital still camera 1 includes a solid-state imaging device (CCD, CMOS or the like) 15, and is provided with an imaging lens 11, an aperture diaphragm 12, an infrared cut-off filter 13 and an optical low-pass filter (OLPF) 14 in front of the solid-state imaging device 15.

The digital still camera 1 includes an operating unit 3. The operating unit 3 is provided with a power button, a mode setting dial, a two-step stroke-type shutter release button, and the like. An operation signal which is output from the operating unit 3 is input to the CPU 2. A mode which is set by the mode setting dial includes an image capture mode, a playback mode and the like. The image capture mode further includes a normal image capture mode, a stereoscopic image capture mode and the like.

In addition, the digital still camera 1 is provided with a light-emitting device 4 for strobe imaging and a light-receiving device 5 for receiving reflected light of light emitted from the light-emitting device 4.

When the digital still camera 1 is powered on, and the image capture mode is set, a pencil of light rays indicating a subject image is incident on a light-receiving surface of the solid-state imaging device 15 through the imaging lens 11, the aperture diaphragm 12, the infrared cut-off filter 13 and the optical low-pass filter 14. The subject image is formed on the light-receiving surface of the solid-state imaging device 15, and an analog video signal indicating the subject image is output from the solid-state imaging device 15. The subject image is formed at a constant period by the solid-state imaging device 15, and the analog video signal indicating the subject image is output for each frame at a constant period.

The analog video signal indicating the subject image which is output from the solid-state imaging device 15 is input to an analog signal processing device 16. The analog signal processing device 16 includes a correlation double sampling circuit, a signal amplifier and the like, correlation double sampling, signal amplification and the like are performed herein. The analog video signal which is output from the analog signal processing device 16 is input to an analog/digital conversion circuit 17, and is converted into digital image data herein. The digital image data is supplied to a memory control circuit 21 through a data bus 32. The digital image data is temporarily recorded in a main memory 22 under control of the memory control circuit 21. The CPU 2, the memory control circuit 21 and the like are connected to each other by a control line 31.

The digital image data is read out from the main memory 22, and is input to a digital signal processing circuit 23 through the data bus 32. In the digital signal processing circuit 23, predetermined digital signal processes such as a white balance adjustment and a gamma correction are performed. Data on which the digital signal process is performed in the digital signal processing circuit 23 is supplied to a display control circuit 28. The subject image is displayed on the display screen by controlling a display device 29 through the display control circuit 28.

When the shutter release button is firstly pressed, focusing is performed by driving the lens 11 through a lens driving circuit 6. Luminance data is obtained in the digital signal processing circuit 23 based on the image data which is read out from the main memory 22, and the luminance data is input to an integration circuit 25 and is integrated. Data indicating an integrated value is supplied to the CPU 2 and the amount of exposure is calculated. An opening of the aperture diaphragm 12 is controlled by an aperture diaphragm driving circuit 7 so as to obtain the amount of exposure calculated, and the shutter speed of the solid-state imaging device 15 is controlled by an imaging device driving circuit 8.

When the shutter release button is secondly pressed, image data which is output from the analog/digital conversion circuit 17 is recorded in the main memory 22. The predetermined digital signal process is performed in the digital signal processing circuit 23, as mentioned above, on the image data which is read out from the main memory 22. Image data which is output from the digital signal processing circuit 23 is compressed in a compression and expansion processing circuit 24. The compressed image data is recorded in a memory card 27 by the control of an external memory control circuit 26.

When the playback mode is set in the operating unit 3, the compressed image data recorded in the memory card 27 is read out. The read-out compressed image data is expanded in the compression and expansion processing circuit 24, and then is supplied to the display control circuit 28. A reproduced image is displayed on the display screen of the display device 29.

As mentioned above, the digital still camera 1 can obtain a stereoscopic image. When the stereoscopic image is obtained, the mode selection dial of the operating unit 3 is used and the stereoscopic image capture mode is selected. Operations of the digital still camera 1 when the stereoscopic image capture mode is selected will be described below in detail.

FIG. 3 is a flow diagram illustrating operations of the digital still camera 1 when the stereoscopic image capture mode is set by the mode setting dial. FIGS. 4, 5 and 6 all show an image example of an image for a left eye and an image for a right eye obtained by image capture using the digital still camera 1.

In the flow diagram shown in FIG. 3, a corresponding point search process (steps 43 and 44), a corresponding point number count process (step 45), a determination process (step 46) based on the number of corresponding points, and a stereoscopic image creation process (step 47) are performed by the digital signal processing circuit 23 or CPU 2 mentioned above. Naturally, a dedicated hardware circuit (a corresponding point searching circuit, a corresponding point number count circuit, a determination circuit, a stereoscopic image creation circuit, or the like) for executing these processes may be separately provided in the digital still camera 1. The same is true of other examples described later.

The capture of an image for a left eye is performed by pressing down the shutter release button, and image data for a left eye is stored in the main memory 22 (step 41). Thereafter, the digital still camera 1 is moved in the right direction, and the capture of an image for a right eye is performed by pressing down the shutter release button again. Image data for a right eye is also stored in the main memory 22 (step 42). The position (viewpoint) of the digital still camera 1 in which the capture of an image for a left eye is performed and the position of the digital still camera 1 in which the capture of an image for a right eye is performed are different from each other, but the same subject is captured in any image capture (see FIG. 1).

The corresponding point search process is performed using the image data for a left eye and the image data for a right eye which are stored in the main memory 22 (step 43).

in the corresponding point search process, using one of the image data for a left eye and the image data for a right eye which are stored in the main memory 22, angles, points of intersection between lines and the like of an object of the image are detected and are set to feature points (feature pixels), and a process of searching for pixels (called corresponding points) having a high correlation with the above-mentioned feature points in the other image is performed. The corresponding point search process is locally performed by template matching or the like, and a process for the entire image is executed by multiple times of corresponding point search processes (NO in step 44). A plurality of feature points are generally detected in the corresponding point search process, and a plurality of corresponding points are searched for and found. In this example, feature points are detected using an image L1 for a left eye, and corresponding points corresponding to the above-mentioned feature points are searched for using images R1 to R3 for a right eye. In FIGS. 4 to 6, the image L1 for a left eye is shown at the left side, and the images R1 to R3 for a right eye are shown at the right side. A plurality of corresponding points found by the above-mentioned search are emphasized by black circles on the images R1 to R3 for a right eye. A plurality of feature points detected in the image L1 for a left eye are not shown.

When the corresponding point search process is completed (YES in step 44), the number of corresponding points found are counted (step 45), and it is determined whether the number of corresponding points is equal to or more than a predetermined threshold (first threshold; for example, it is 1%, but may not be 1%), here, equal to or more than 1% the number of all pixels of the image R1 for a right eye (it goes without saying that the number is the same as the number of all pixels of the image L1 for a left eye) (step 46). For example, when the image R1 for a right eye is formed of 1,024 pixels wide by 768 pixels long, 1% of the number of all pixels (1,024×768=786,432) is approximately 7,864 pixels. It is determined whether the number of corresponding points found in the corresponding point search process is equal to or more than 7,864.

When the number of corresponding points is less than 1% of the number of all pixels (NO in step 46), for example, a display to the effect that the follow-up image capture is required is performed for a user, and then the image for a right eye is recaptured by a user (step 42). Alternatively, when the number of corresponding points is less than 1% of the number of all pixels (NO in step 46), for example, the image for a right eye is recaptured by full automation (step 42). Referring to FIG. 4, the image R1 for a right eye shown in FIG. 4 shows an example in which the number of corresponding points corresponding to the feature points obtained from the image L1 for a left eye is small (less than 1% of the number of all pixels). In this case, as mentioned above, the image for a right eye is recaptured. Image data indicating the image R2 for a right eye (FIG. 5) obtained by the recapture is newly stored in the main memory 22 in place of or in addition to image data indicating the image R1 for a right eye obtained by the first image capture. The image data indicating the image L1 for a left eye is held in the main memory 22 as it is.

The corresponding points are searched for using a new image R2 for a right eye obtained by the recapture, and the number of corresponding points found is counted (steps 42 to 45). In the second and following corresponding point search process, the feature points of the image L1 for a left eye already detected in the first corresponding point search process is used, and the corresponding points corresponding to the feature points are searched for from the image R2 for a right eye newly obtained.

When the number of corresponding points of the image R2 for a right eye obtained the second image capture is also less than 1% of the number of all pixels, the third capture of the image for a right eye is further performed (NO in step 46, step 42), and the corresponding point search process and the corresponding point number count process are repeated (steps 43 to 45).

Referring to FIG. 6, an image R3 for a right eye shown in FIG. 6 shows an example in which the number of corresponding points is large (equal to or more than 1% of the number of all pixels) (for convenience of illustration, all the corresponding points are not shown). When the number of corresponding points is equal to or more than 1% of the number of all pixels (YES in step 46), a stereoscopic image file is created from image data indicating the image for a left eye and the image for a right eye which are then stored in the main memory 22, here, two images of the image L1 for a left eye and the image R3 for a right eye (step 47). Data according to a multi-picture format which includes image data indicating the image L1 for a left eye and image data indicating the image R3 for a right eye is recorded in the stereoscopic image file. The created stereoscopic image file is recorded and stored in the memory card 27 by the external memory control circuit 26 (step 48). A series of processes in the stereoscopic image capture mode is terminated.

In the above-mentioned example, the images R1, R2, and R3 for a right eye obtained by multiple times of image capture are obtained by, for example, continuous shooting (image capture for each timing at which multiple pieces of image capture is performed during one second). When a user holds the digital still camera 1 with both hands, normally, the directions of the digital still camera 1 are generally different from each other at each timing of continuous shooting, and thus there is a high possibility that an image for a right eye having a large number of corresponding points is obtained during multiple times of image capture.

When the number of corresponding points in the image for a right eye which correspond to the feature points obtained from the image for a left eye is small, using the two images may cause stereoscopic viewing to be difficult or a sense of discomfort to occur in stereoscopic viewing. As mentioned above, when the number of corresponding points is smaller than a predetermined threshold (in the above-mentioned example, 1 percent of the number of all pixels), the image for a right eye is recaptured. When an image for a right eye having corresponding points equal to or more than the predetermined threshold is obtained, a stereoscopic image is formed using the image for a right eye. Since a stereoscopic image file is created from a set of image for a left eye and image for a right eye in which the viewpoints are different from each other and the compositions are relatively consistent with each other, it is possible to obtain a set of image for a left eye and image for a right eye (stereoscopic image) suitable for stereoscopic viewing.

In the above-mentioned first example, when the number of corresponding points is not equal to or more than the predetermined threshold even in the case where multiple times of image capture within the number of image capture (the number of processes) set in advance or the time set in advance is terminated, it may be determined whether a threshold is lowered (the percent value used in the determination of step 46 is made smaller), and recapture is performed using the lowered threshold. The same is true of other examples described later.

In addition, in the above-mentioned first example, whenever the images for a right eye R1, R2, and R3 are captured, the corresponding point search process (steps 43 and 44), the corresponding point number count process (step 45), and the determination process (step 46) based on the number of corresponding points are performed. However, a plurality of images for a right eye are obtained in advance by continuous capture for a certain period of time, and then the corresponding point search process (steps 43 and 44), the corresponding point number count process (step 45), and the determination process (step 46) based on the number of corresponding points may be performed on each of the plurality of images for a right eye. The same is true of other examples described later.

Modified Example

Figure 7:
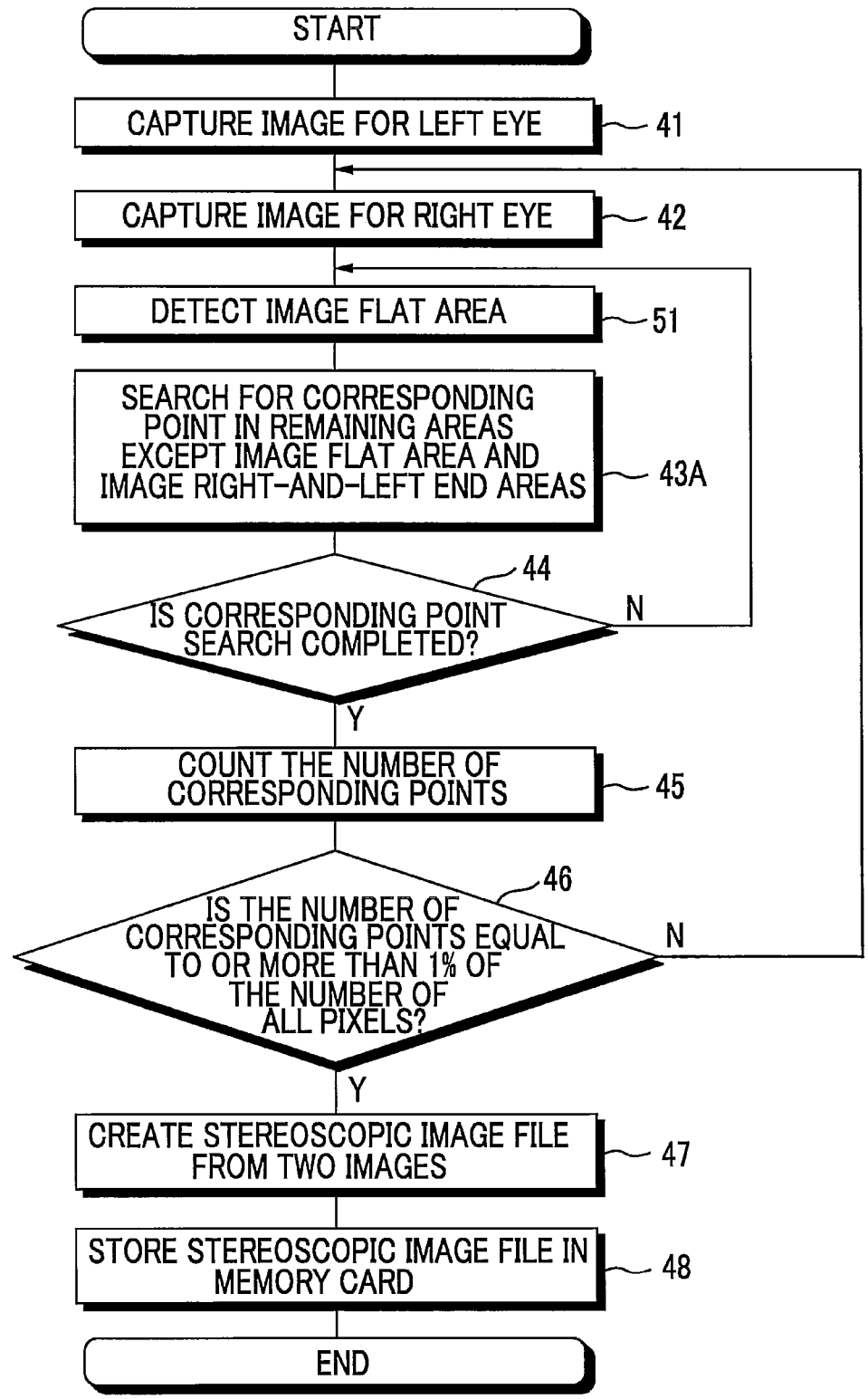
FIG. 7 is a flow diagram illustrating operations of the digital still camera in a modified example of the first example.

FIG. 7 is a flow diagram illustrating operations of the digital still camera 1 in a modified example of the first example. The same processes as those in the flow diagram of the first example shown in FIG. 3 are denoted by the same reference numerals and signs, and the detailed description thereof will not be repeated.

In the first example, the corresponding point search process is performed using the entire areas of the image for a left eye and the image for a right eye. In the modified example of the first example, with the exception of image flat areas and image right-and-left-end areas described later, the corresponding point search process is performed using the remaining areas except the image flat areas and the image right-and-left-end areas as processing objects.

Figure 8:
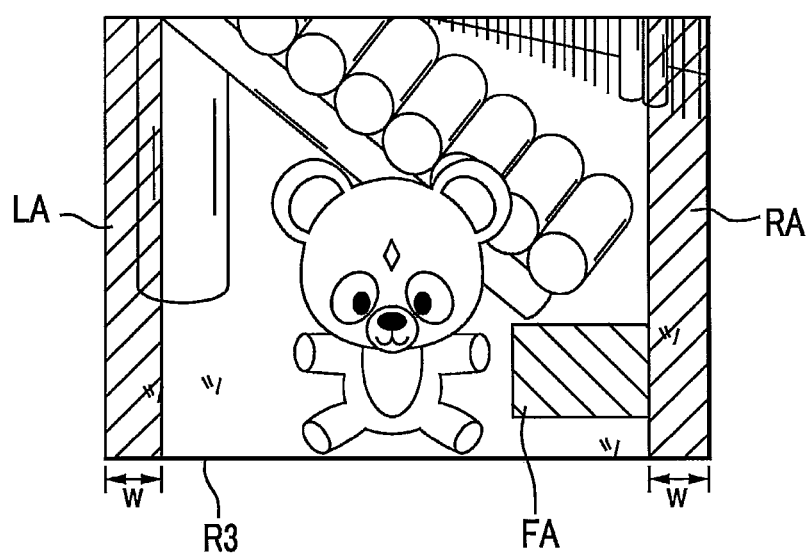
FIG. 8 is a diagram illustrating a relationship between an image for a right eye and an image flat area, an image left-end area and an image right-end area.

FIG. 8 shows a relationship between the image R3 for a right eye and an image flat area FA, an image left-end area LA and an image right-end area RA.

After the capture of the image for a left eye and the image for a right eye is terminated, and before the process proceeds to the corresponding point search process, a detection process of the image flat area is performed (step 51). In the detection process of the image flat area, using the image for a right eye as a processing object, high frequency components are extracted using, for example, a band-pass filter, a process of detecting an area having a small luminance change is performed using the extracted high frequency components. The detected area having a small luminance change is set to the image flat area FA. For example, when the luminance change of the entire image is in the range of 0 to 255, the luminance change in the image flat area means a range of ±2, that is, appropriately 1%. The image flat area detection process is performed by the digital signal processing circuit 23 or the CPU 2. An area having a small color change is detected from, for example, a color vector of each pixel instead of the area having a small luminance change, and may be set to the image flat area FA.

Both the image left-end area LA and the image right-end area RA have a width w of the number of pixels of 10% of the number of horizontal pixels of the image R3 for a right eye. The range of the above-mentioned width w facing right from the left end of the image R3 for a right eye is set to the image left-end area LA, and the range of the width w facing left from the right end of the image R3 for a right eye is set to the image right-end area RA. The above-mentioned corresponding point search process is performed on the remaining areas except the detected image flat area FA, image left-end area LA, and image right-end area RA (step 43A).

In the image flat area FA having a small luminance change or color change, the corresponding points are not likely to be detected. The efficiency of the corresponding point search process is achieved by excluding the image flat area FA from the processing area in advance. In addition, the right and left ends of the image may have a small overlap of the image for a left eye and the image for a right eye, and are areas in which the corresponding points are not present or difficult to find. The efficiency of the corresponding point search process is also achieved by excluding the image left-end area LA and the image right-end area RA from the corresponding point search process.

Second Example

Figure 9:
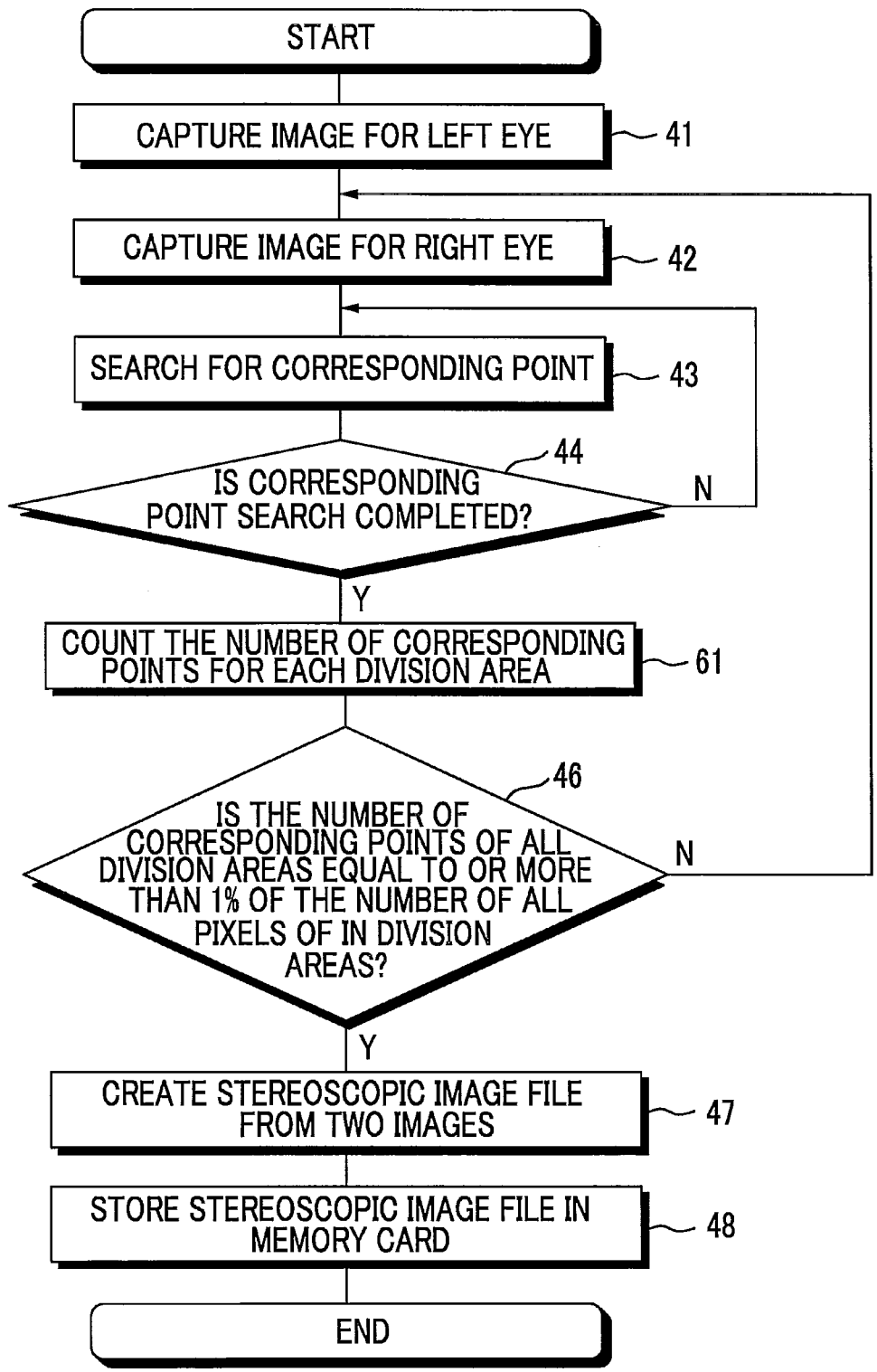
FIG. 9 is a flow diagram illustrating operations of the digital still camera in a second example.

FIG. 9 is a flow diagram illustrating operations of the digital still camera 1 according to a second example. The same processes as those in the flow diagram of the first example shown in FIG. 3 are denoted by the same reference numerals and signs, the detailed description thereof will not be repeated. FIG. 10 shows an image example of the image for a left eye and the image for a right eye which are obtained by imaging using the digital still camera 1. Processes of the digital still camera 1 according to the second example will be described with reference to the image example shown in FIG. 10.

In the second example, the image for a right eye in which the corresponding points are searched for is divided into a plurality of areas, and the number of corresponding points is counted for each division area. It is then determined whether the number of corresponding points of each of the division areas is equal to or more than a predetermined threshold.

Referring to FIG. 10, the image R1 for a right eye is divided into three equal parts in each of the longitudinal direction and the transverse direction, and a total of nine division areas d1 to d9 are specified. Naturally, fewer or larger division areas can also be specified. In addition, all the division areas are not set to be the same shape (the same number of pixels), but for example, a central area of the image R1 for a right eye and division areas, such as peripheral areas surrounding the central area, which are different from each other in shape may be specified.

Processes in which the image for a left eye is captured, the image for a right eye is then captured by moving the digital still camera 1 in the right direction, and the corresponding point search process is performed using the obtained image for a left eye and image for a right eye are the same as those in the above-mentioned first example (steps 41 to 44).

The division areas d1 to d9 are specified in the image R1 for a right eye, and the number of corresponding points for each of the division areas d1 to d9 is counted (step 61).

It is determined whether the number of corresponding points contained in each division area is equal to or more than 1% of the number of pixels of the division area (fourth threshold; it may not be 1%) with respect to all the division areas d1 to d9 (step 62).

In the division areas d1 to d9 into which the image R1 for a right eye shown in FIG. 10 is divided, it is determined whether the number of corresponding points of each of the nine division areas d1 to d9 is equal to or more than 1% of the number of pixels of each of the division areas d1 to d9. Naturally, when the numbers of pixels of the division areas d1 to d9 are equal to each other (in the case of equal division), it may be determined whether the number of corresponding points is equal to or more than 1 percent of the number of pixels only for a division area having the smallest number of corresponding points counted.

When a division area is present in which the number of corresponding points is less than 1 percent of the number of pixels of the division area, the follow-up capture of the image for a right eye is performed. Processes in which an image for a right eye obtained by the second (further, third) image capture is newly used and the above-mentioned processes are repeated are the same as those in the first example (NO in step 62, steps 42 to 44, and step 61).

When the number of corresponding points of all the division area is equal to or more than 1% of the number of pixels of the division areas (YES in step 62), the image for a right eye is not further captured, but a stereoscopic image file is created using the image for a left eye and the image for a right eye at that time, and is stored in the memory card 27 (steps 47 and 48).

Since a stereoscopic image file is created using the image for a right eye including a large number of corresponding points in all the division areas d1 to d9, it is possible to obtain a stereoscopic image capable of being stereoscopically viewed in the entire image.

In the second example, similarly to the modified example (see FIG. 8) of the above-mentioned first example, the remaining areas except the image flat area FA and the image right-and-left-end areas LA and RA may be used as processing objects, and the corresponding point search process may be performed. In this case, the number of pixels of the division areas obtained with the exception of the above-mentioned image flat area FA and image right-and-left-end areas LA and RA is used in the determination of step 62.

Third Example

Figure 11:
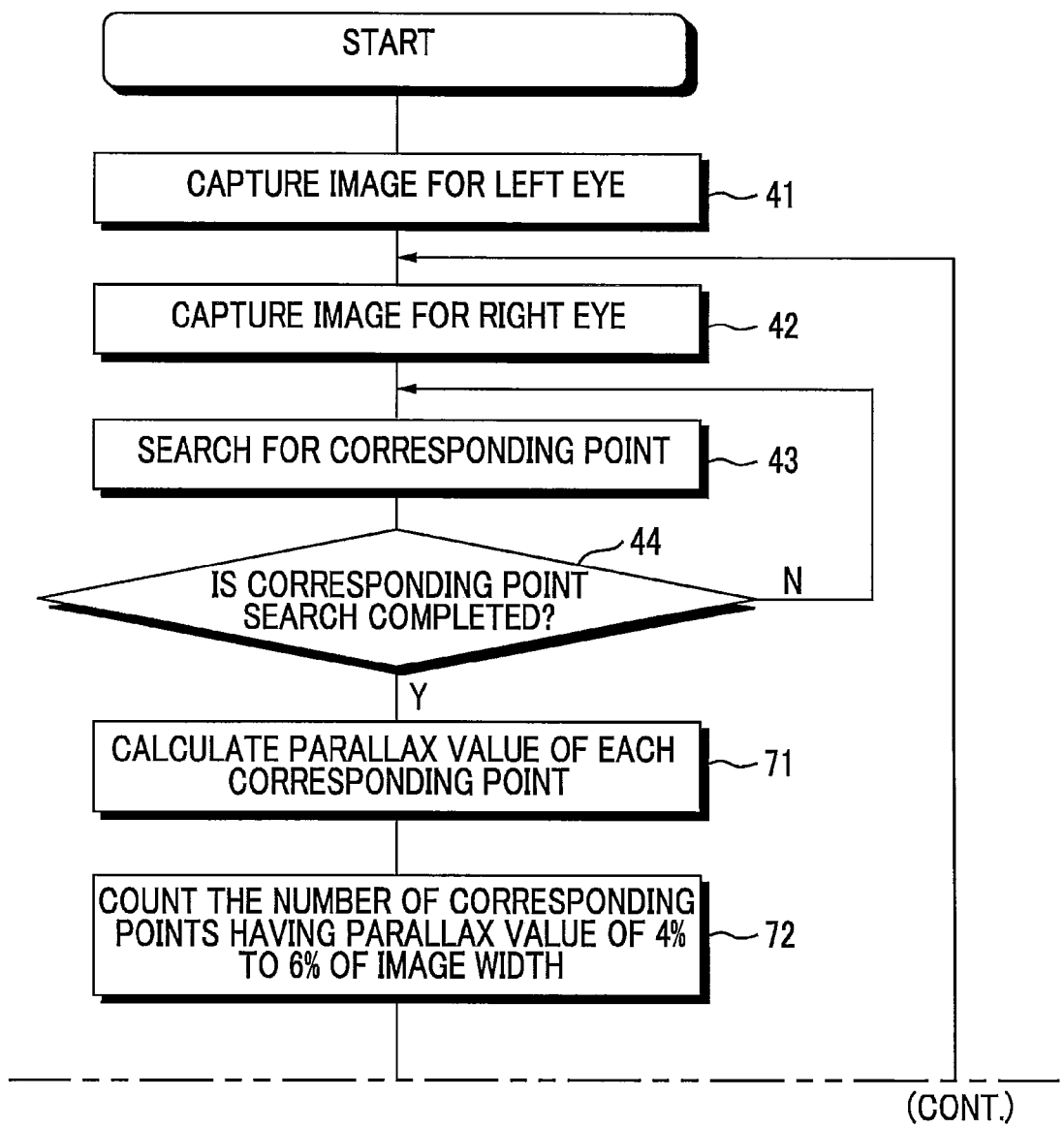
FIG. 11 is a flow diagram illustrating processes of the digital still camera in a third example.

FIG. 11 is a flow diagram illustrating processes of the digital still camera 1 according to a third example. The same processes as those in the flow diagram of the first example shown in FIG. 3 are denoted by the same reference numerals and signs, and the description thereof will not be repeated.

in the first example and the second example, focusing on the number of corresponding points of itself searched for from the image for a right eye, it is determined whether the image for a right eye is set to an image constituting the stereoscopic image file (whether to perform recapture). In the third example, unlike the first and second examples, it is determined whether the image for a right eye is set to an image constituting the stereoscopic image (whether to perform recapture) in consideration of the gaps between feature points and corresponding points corresponding to the feature points, that is, parallax for each corresponding point, instead of the number of corresponding points of itself.

Figure 12:
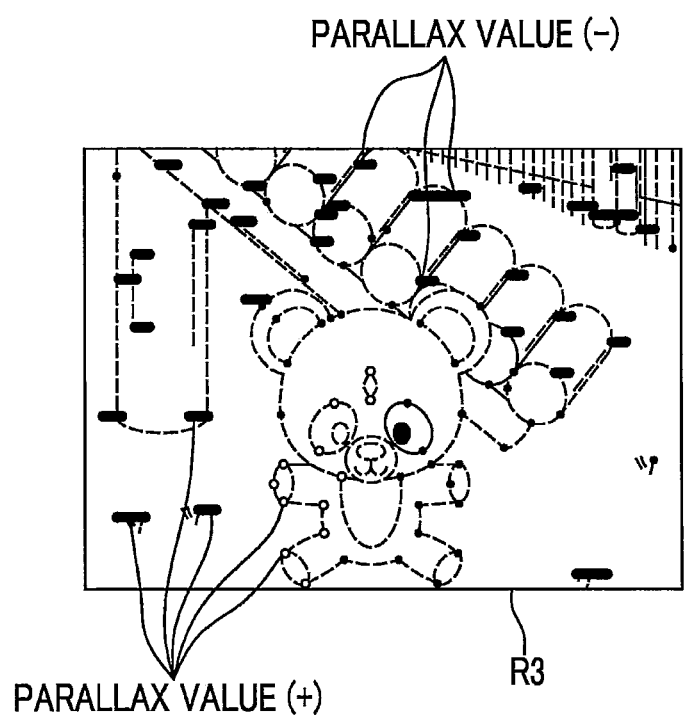
FIG. 12 is a diagram illustrating parallax for each corresponding point which overlaps an image for a right eye shown by the broken lines.

FIG. 12 is a diagram illustrating parallax used in the processes of the digital still camera 1 according to the third example which overlaps the image R3 for a right eye shown by the broken lines.

A value indicating parallax (hereinafter, called a parallax value) is calculated for each corresponding point by subtracting a horizontal coordinate value of a corresponding point in the image for a right eye corresponding to a feature point in the image for a left eye from a horizontal coordinate value of the feature point. The parallax value is set to a positive (+) value or a negative (−) value based on the positions of the feature point and the corresponding point. In FIG. 12, the parallax values having negative values are shown by black circles and heavy black lines. The parallax values having positive values are shown by white circles and heavy white lines. The length of the heavy line shows a size of the parallax value. When a stereoscopic image is formed, for example, the corresponding point having a negative parallax value is visually recognized like recession in the depth direction, and the corresponding point having a positive parallax value is visually recognized like protrusion in the near direction.

In the third example, similarly to the first example and the second example, the corresponding point search process is performed. That is, the feature point is detected from the image for a left eye, and the corresponding point corresponding to the detected feature point is searched for from the image for a right eye (steps 41 to 43). Thereafter, as mentioned above, the parallax value for a set of feature point and corresponding point is calculated depending on the number of pixels by subtracting a horizontal coordinate value of the corresponding point corresponding to the detected feature point from a horizontal coordinate value of the feature point (step 71). The parallax value for each corresponding point is calculated.

The number of corresponding points having a parallax value with a predetermined size (absolute value) in a plurality of corresponding points is counted (step 72). For example, the number of corresponding points having a parallax value equivalent to the number of pixels of 4% to 6% of the number of horizontal pixels of the image R3 for a right eye is counted. When the number of horizontal pixels of the image R3 for a right eye is set to 1,024, the number of corresponding points having a parallax value in the range of 4% to 6% of the value, that is, 41 to 61 pixels is counted.

It is determined whether the number of corresponding points having a parallax value with a predetermined size is equal to or more than 0.2% of the number of all pixels (second threshold; it may not be 0.2%) (step 73). For example, when the image R3 for a right eye is formed of 1,024 pixels wide by 768 pixels long, 0.2% of the number of all pixels is approximately 1,572. It is determined whether the number of corresponding points having a parallax value counted with a predetermined size is equal to or more than 1,572.

When the number of corresponding points having a predetermined parallax value is less than 0.2% of the number of all pixels NO in step 73), similarly to the first example and the second example, the image for a right eye is recaptured (step 42), and the above-mentioned process is repeated using an image for a right eye newly obtained (steps 43, 44, and 71 to 73). When the number of corresponding points having a predetermined parallax value is equal to or more than 0.2% of the number of all pixels, a process proceeds to the creation and storage of the stereoscopic image file (YES in step 73, and steps 47 and 48).

Since the stereoscopic image file is formed using the image for a right eye including many corresponding points having a parallax value suitable for stereoscopic viewing, it is possible to obtain a stereoscopic image suitable for stereoscopic viewing.

In the above-mentioned third example, although the process using the size (absolute value) of the parallax value is performed, the process as mentioned above may be performed by prioritizing either of the corresponding point having a negative parallax value or the corresponding point having a positive parallax value. For example, when only the corresponding point having a negative parallax value is used, a stereoscopic image file is generated using the image for a right eye including many corresponding points having a negative parallax value. A stereoscopic image in which a sense of depth is emphasized is easily obtained. When only the corresponding point having a positive parallax value is used, a stereoscopic image file is generated using the image for a right eye including many corresponding points having a positive parallax value. A stereoscopic image in which a sense of protrusion is emphasized is easily obtained.

In the third example, similarly to the modified example of the first example, the corresponding point search process may be performed using the remaining areas except the image flat area and the image right-and-left-end areas as processing objects. In addition, similarly to the second example, a stereoscopic image file may be created by dividing the image for a right eye into a plurality of division areas, counting the number of corresponding points having a parallax value with a predetermined size for each division area, and using the image for a right eye in which the corresponding points having a parallax value with a predetermined size equal to or more than a predetermined number are present in all the division areas.

When a large number of corresponding points having an excessively large parallax value are present in the image for a right eye, a sense of discomfort may occur in stereoscopic viewing. In the above-mentioned third example, when a large number of corresponding points having a parallax value equal to or more than a parallax value (called a limit parallax value) unsuitable for stereoscopic viewing are found, the follow-up capture of the image for a right eye may be performed. For example, the parallax value equivalent to the number of pixels of 10% of the number of horizontal pixels of the image for a right eye is set to a limit parallax value. When the number of corresponding points having a parallax value equal to or more than the limit parallax value is found to be equal to or more than a predetermined threshold (value set by a predetermined ratio to the number of all pixels of the image for a right eye; third threshold), the follow-up capture of the image for a right eye is performed. When the number of corresponding points having a parallax value equal to or more than the limit parallax value is less than a predetermined threshold, the process proceeds to the creation of the stereoscopic image file.

In the above-mentioned first to third examples, although a description has been made of an example in which one stereoscopic image file is generated using the image L1 for a left eye and the image R3 for a right eye obtained by still image capture, it is also possible to obtain a stereoscopically visible moving image by continuously generating a stereoscopic image file. In this case, the subject image is continuously formed, and the processes of the flow diagrams shown in FIGS. 3, 7, 9, and 11 are continuously repeated, to thereby create a large number of stereoscopic image files. A large number of stereoscopic image files are continuously reproduced, and thus a stereoscopically visible moving image is visually recognized.

Other Modified Examples and the Like

Figure 13:
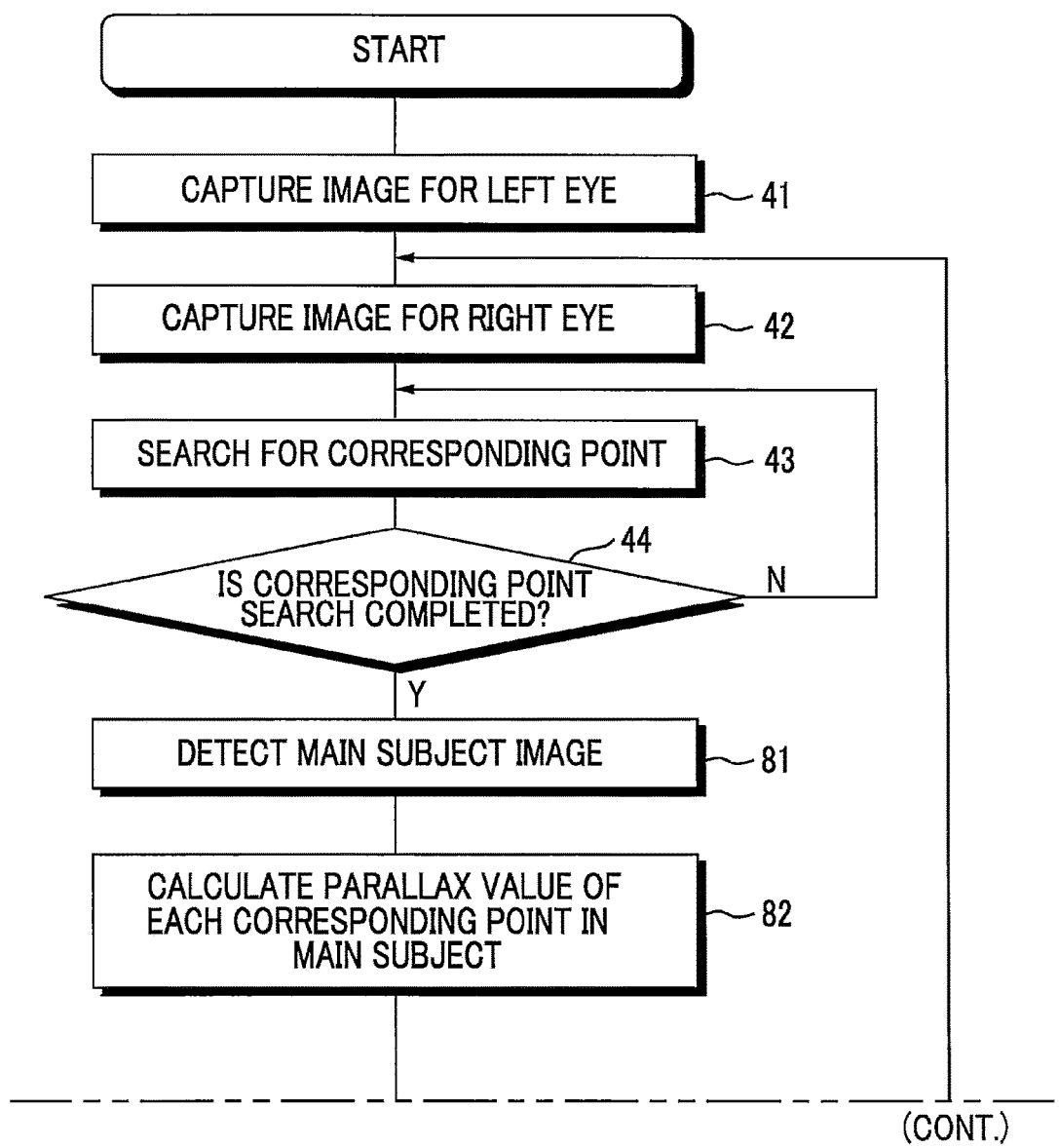
FIG. 13 is a flow diagram illustrating processes of the digital still camera.
Figure 14:
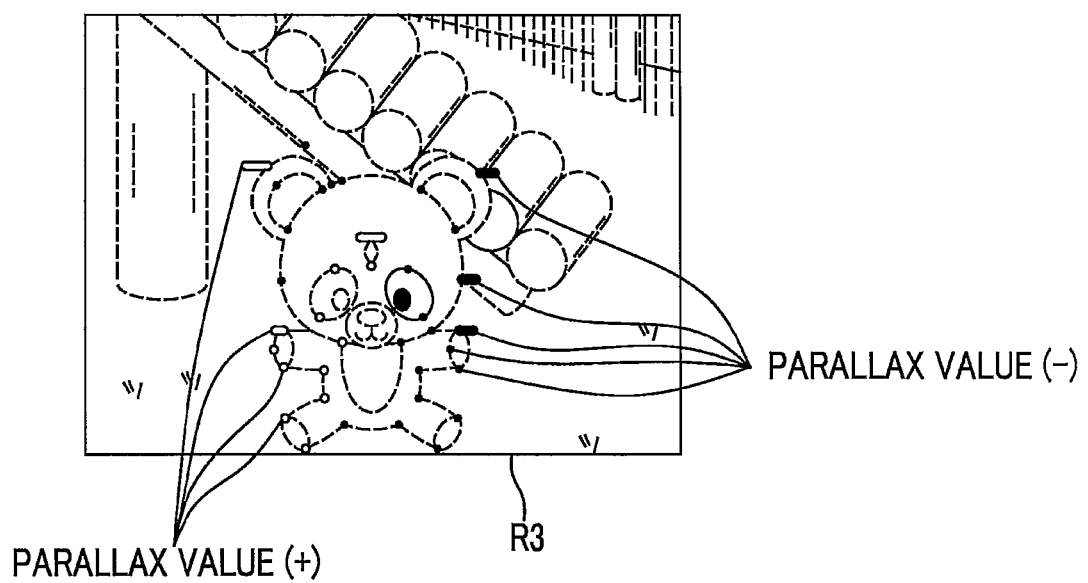
FIG. 14 is a diagram illustrating an image example of an image for a right eye.

FIGS. 13 and 14 are diagrams illustrating a modified example of the third example. FIG. 13 is a flow diagram illustrating processes of the digital still camera 1. In the processes of FIG. 13, the same processes as the processes shown in FIG. 11 are denoted by the same reference numerals and signs. FIG. 14 is a diagram illustrating an example of the image for a right eye in which parallax values are shown.

In the third example, it is determined whether the image for a right eye is recaptured in consideration of the parallax of the corresponding points of the entire image. However, in the modified example shown in FIGS. 13 and 14, it is determined whether the image for a right eye is recaptured in consideration of the parallax of the corresponding points within a main subject image.

As mentioned above, the image R3 for a right eye is obtained (step 42), and the corresponding points are searched for (see steps 43 and 44, and FIG. 6).

Subsequently, the main subject is detected from the obtained image R3 for a right eye (step 81). When the main subject of the image R3 for a right eye is set to a bear image OB, the bear image OB is detected. For example, the main subject is detected using the position, the ratio to the image, the degree of focusing, and the like.

When the main subject is detected, a parallax value of each corresponding point present in the main subject OB is calculated (step 82). The parallax value is expressed by the number of pixels for each corresponding point as mentioned above.

In FIG. 14, as mentioned above, the parallax values are shown in the image R3 for a right eye. In order to easily understand the parallax values, the subject images are shown by the broken lines. The parallax values are shown with respect to the corresponding points present in the main subject OB, and the parallax values are not calculated with respect to the image portions other than the main subject OB. However, the parallax values for the image portions other than the main subject OB may be calculated, and the parallax values for the image portions other than the main subject OB may be excluded from a count object described later.

When the parallax value for each corresponding point present in the main subject OB is calculated, as mentioned above, using parallax of the main subject as parallax of the stereoscopic image among these parallax value, the number of corresponding points having a parallax value with a predetermined size (absolute value) in an appropriate range is counted (step 72). In this case, as mentioned above, for example, the number of corresponding points having a parallax value equivalent to the number of pixels of 4% to 6% of the number of horizontal pixels of the image R3 for a right eye is counted. When the number of horizontal pixels of the image R3 for a right eye is 1,024, the number of corresponding points having a parallax value in the range of 4% to 6% of the value, that is, 41 to 61 pixels is counted.

Subsequently, it is determined whether the number of corresponding points having a parallax value with a predetermined size is equal to or more than 0.3% (second threshold) of the number of pixels of the main subject (step 83). For example, when the number of pixels of the main subject is 50,000, it is determined whether such a number of corresponding points is equal to or more than 150.

When the number of corresponding points having a predetermined parallax value is less than 0.3% of the number of pixels of the main subject OB (NO in step 83), the image for a right eye is recaptured (step 42). The processes of steps 43, 44, 81, 82, 72, and 83 are repeatedly performed on an image for a right eye newly obtained. When the number of corresponding points having a predetermined parallax value is equal to or more than 0.3% of the number of pixels of the main subject OB (YES in step 83), a stereoscopic image file is created from the image for a right eye and the image for a left eye obtained at that time (step 47). The created stereoscopic image file is stored in the memory card 27 (step 48). An image capable of being appropriately stereoscopically viewed is obtained particularly with respect to the main subject.

Figure 15:
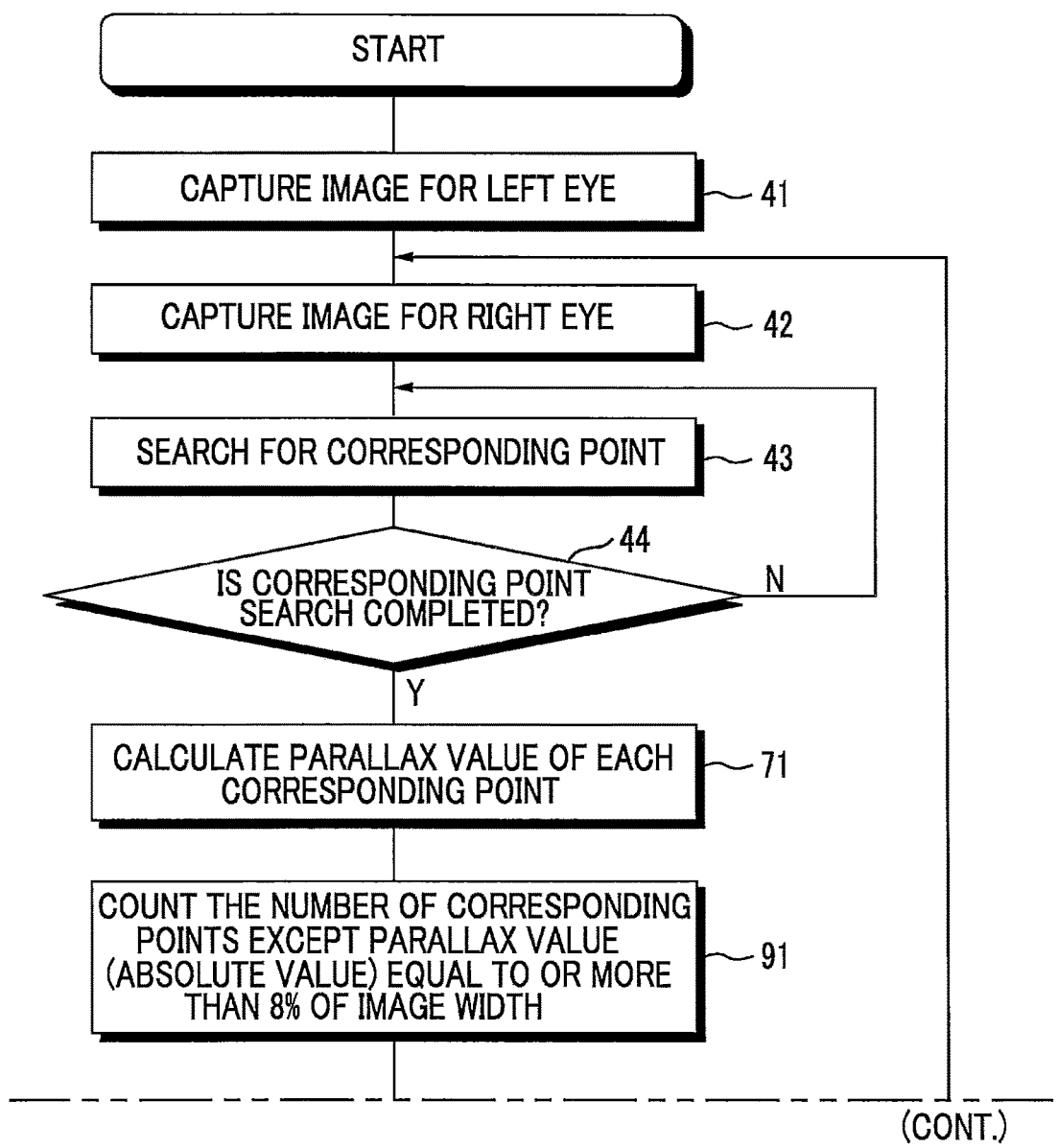
FIG. 15 is a flow diagram illustrating processes of the digital still camera.
Figure 16:
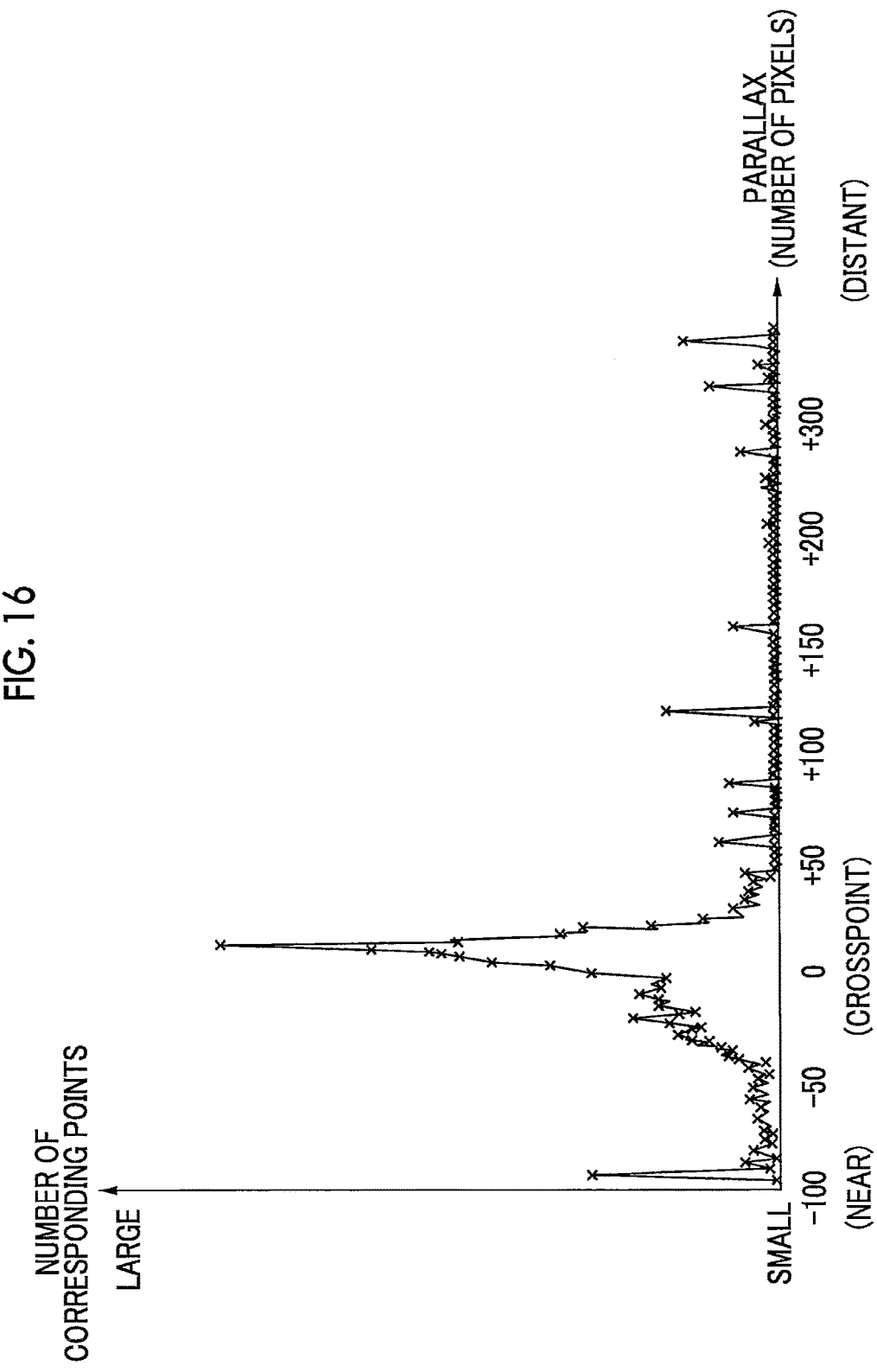
FIG. 16 is a diagram illustrating an example of a parallax histogram.

FIGS. 15 and 16 are diagrams illustrating still another modified example of the above-mentioned third example. FIG. 15 is a flow diagram illustrating processes of the digital still camera 1, and the same processes as the processes shown in FIG. 11 are denoted by the same reference numerals and signs. FIG. 16 shows a histogram of the parallax values. The horizontal axis denotes the parallax value, and the vertical axis denotes the number of corresponding points having the parallax value.

In the modified example shown in FIGS. 15 and 16, the parallax value of each corresponding point is calculated as mentioned above, but the corresponding point having a large parallax value is excluded from the count object.

As mentioned above, the image for a left eye and the image for a right eye are obtained, and the corresponding points are calculated with respect to the entire right image (steps 41 to 44, and 71) (as mentioned above, the main subject may be detected, and the parallax value of the corresponding point may be calculated with respect to the main subject). When the corresponding points are calculated, the parallax value histogram is generated as shown in FIG. 16.

Using the generated parallax value histogram, the number of corresponding points except the corresponding point having a parallax value equal to or more than a predetermined size (absolute value) (sixth threshold) is counted (step 91). For example, the corresponding points having a parallax value equivalent to the number of pixels equal to or more than 8% of the number of horizontal pixels of the image R3 for a right eye are excluded, and the number of remaining corresponding points is counted. When the number of horizontal pixels of the image R3 for a right eye is set to 1,024, the corresponding points having a parallax value equal to or more than 8% of the value, that is, 81 pixels are excluded from the count (the corresponding points having a parallax value less than 81 pixels in the absolute value are counted).

It is determined whether the number of corresponding points counted is equal to or more than 0.3% (first threshold) of the number of all pixels of the image R3 for a right eye (step 46). When the number of corresponding points counted is less than 0.3% (NO in step 46), the image for a right eye is recaptured (step 42), the processes of steps 42 to 44, 71, 91, and 46 mentioned above are repeated using an image for a right eye newly obtained. When the number of corresponding points counted is equal to or more than 0.3% of the number of all pixels of the image R3 for a right eye (YES in step 46), the stereoscopic image file is created and stored (steps 47 and 48).

Figure 17:
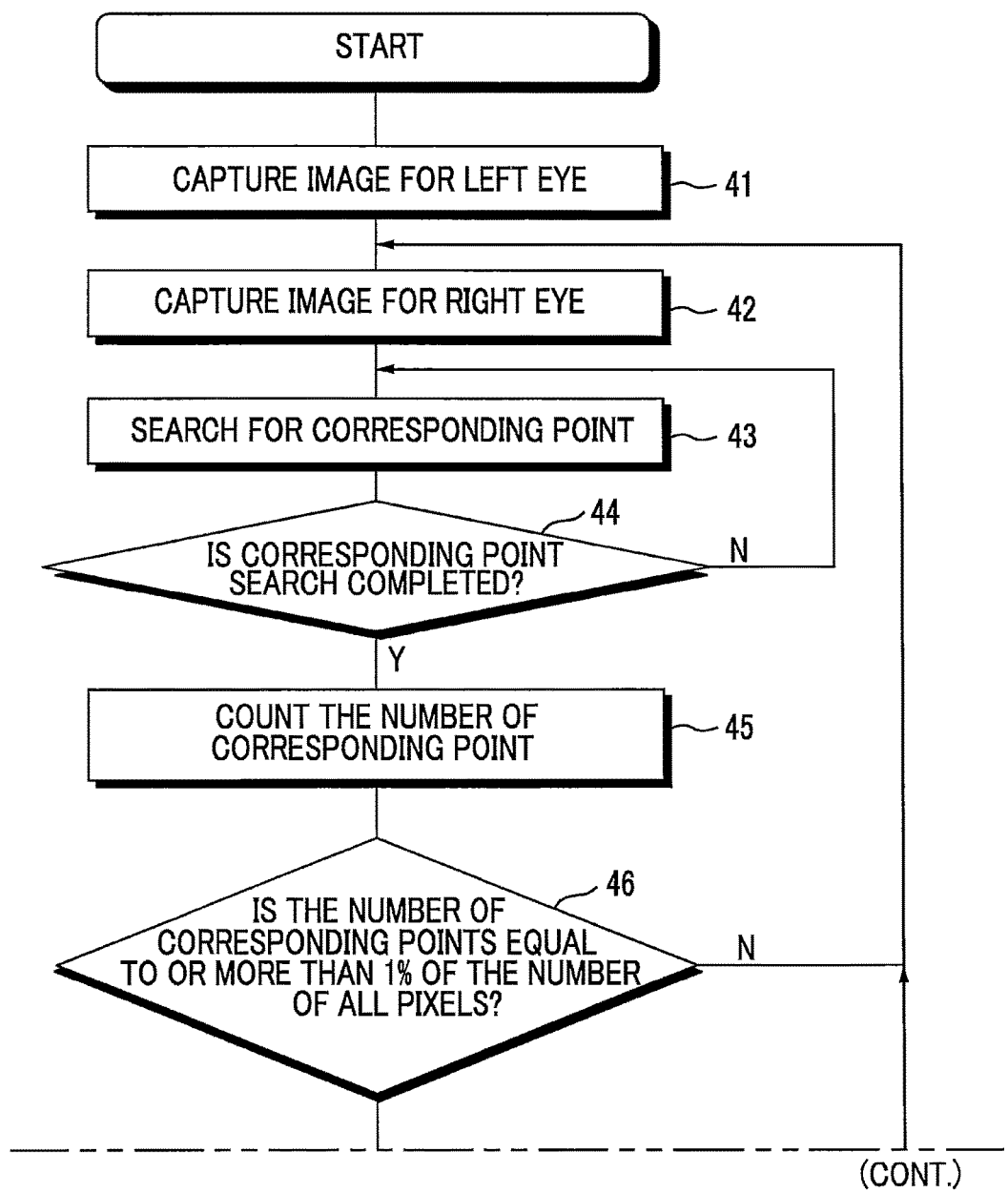
FIG. 17 is a flow diagram illustrating processes of the digital still camera.
Figure 18:
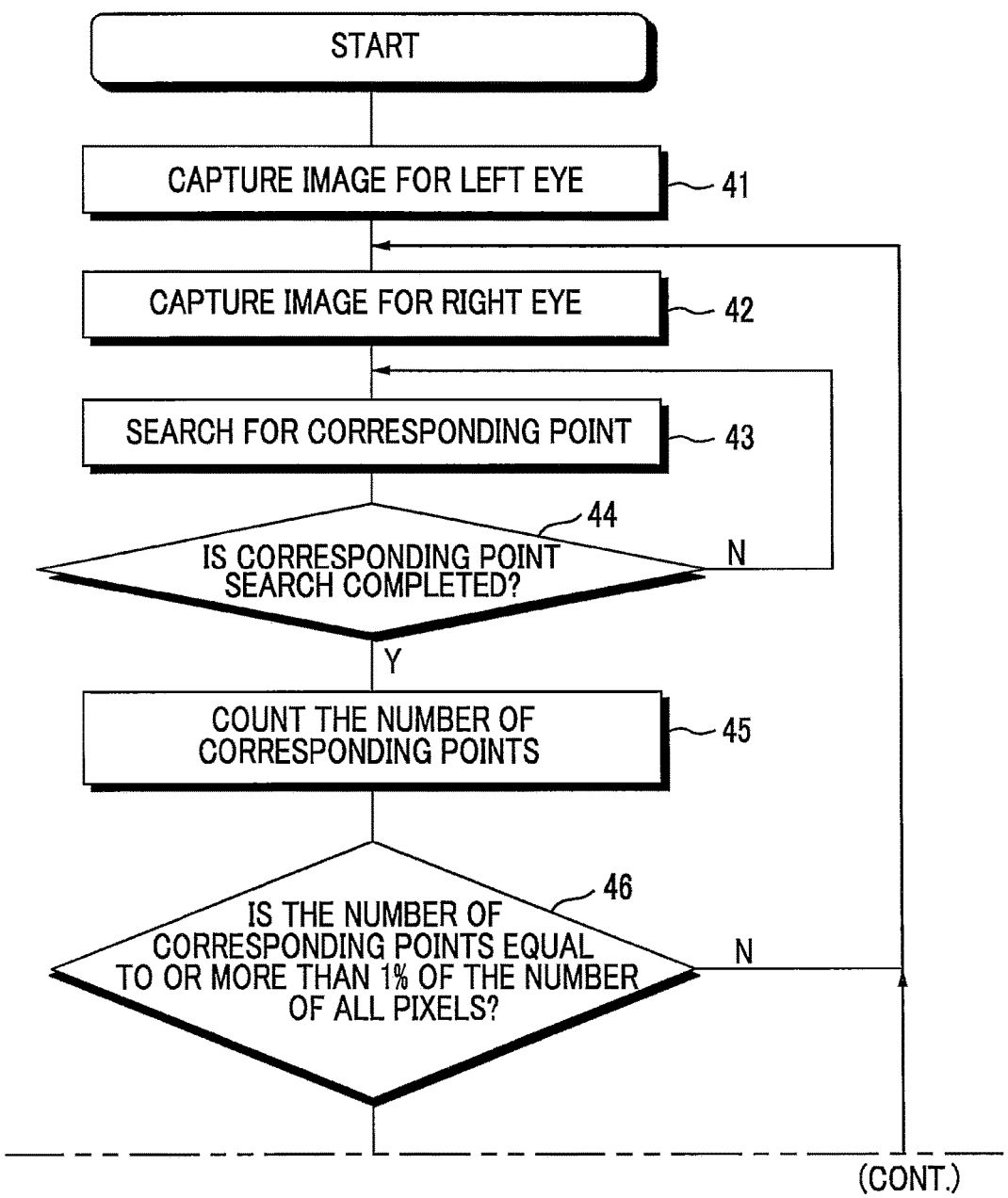
FIG. 18 is a diagram illustrating an image example of an image for a left eye and an image for a right eye.

FIGS. 17 and 18 further show a modified example of the first example. FIG. 17 is a flow diagram illustrating processes of the digital still camera 1, and the same processes as the processes shown in FIG. 3 are denoted by the same reference numerals and signs. FIG. 18 is a diagram illustrating an example of the image for a left eye and the image for a right eye.

The image for a left eye is captured at a viewpoint of a left eye, and the image for a right eye is captured at a viewpoint of a right eye. Therefore, an area (a blind area, or an occlusion area) occurs, which is displayed on one image of the image for a left eye and the image for a right eye, but is not displayed on the other image.

Referring to FIG. 18, a blind area BL is shown by hatching, which is displayed on the image L1 for a left eye at the left side of a main subject OBL contained in the image L1 for a left eye, but is not displayed on an image R4 for a right eye. In addition, a blind area BR is shown by hatching, which is displayed on the image R4 for a right eye at the right side of a main subject OBR contained in the image R4 for a right eye, but is not displayed on the image L1 for a left eye. In the modified example, these blind areas BL and BR (or, at least one area) are considered.

Referring to FIG. 17, the above-mentioned corresponding points are counted (step 45), and it is determined whether the number of corresponding points is equal to or more than 1% of the number of all pixels of the image R4 for a right eye (step 46).

When the number of corresponding points is equal to or more than 1% of the number of all pixels of the image R4 for a right eye (YES in step 46), the blind area BL is detected from the image L1 for a left eye, and the blind area BR is detected from the image R4 for a right eye (step 101). These blind areas BL and BR can be more easily detected by comparing the image L1 for a left eye with the image R4 for a right eye for each corresponding pixel.

When the blind area BL of the image L1 for a left eye and the blind area BR of the image R4 for a right eye are detected, it is determined whether the blind area BL of the image L1 for a left eye is equal to or more than 5% (fifth threshold) of the image L1 for a left eye, and the blind area BR of the image R4 for a right eye is equal to or more than 5% of the image R4 for a right eye (step 102). When both of the blind areas BL and BR are less than 5% of the image corresponding to each of them (NO in step 102), the blind area is small even in the case where a stereoscopic image is generated from the image L1 for a left eye and the image R4 for a right eye, and thus a stereoscopic image having a small sense of discomfort is obtained. As mentioned above, the stereoscopic image file is generated from the image L1 for a left eye and the image R4 for a right eye, and is stored in the memory card 27 (steps 47 and 48). When at least one of the blind areas BL and BR is equal to or more than 5% of the corresponding image (YES in step 102), it is considered that quite a lot of portions are stereoscopically invisible, and thus the image for a right eye is recaptured. The processes of steps 42 to 46, 101, and 102 are repeated.

The portion of the blind area is stereoscopically invisible, but the stereoscopically invisible portion can be made smaller.

In the above-mentioned modified example, when the blind area BL is equal to or more than 5% of the image L1 for a left eye, or the blind area BR is equal to or more than 5% of the image R4 for a right eye, the image R4 for a right eye is recaptured. However, when the blind area BL is equal to or more than 5% of the image L1 for a left eye, and the blind area BR is equal to or more than 5% of the image R4 for a right eye, the image R4 for a right eye may be recaptured.

Further, when it is determined that the number of corresponding points is less than 1% of the number of all pixels, the above-mentioned processes such as step 43 may be performed using one image for a right eye, selected from among a plurality of images for a right eye in advance obtained by multiple times of imaging, as a new image for a right eye. The same is true of the above-mentioned other examples and modified examples without being limited to the first example.

What is claimed is:

1. A stereoscopic image capture device which includes imaging part for imaging a subject to output image data obtained by imaging, and generates a stereoscopic image file from image data indicating a subject image from a viewpoint for a left eye and a viewpoint for a right eye which are output from the imaging part, comprising:

corresponding point search part for searching for a corresponding point corresponding to each of a plurality of feature points detected using first image data obtained from one reference viewpoint of the viewpoint for a left eye and the viewpoint for a right eye, using second image data obtained from the other viewpoint of the viewpoint for a left eye and the viewpoint for a right eye which is different from the reference viewpoint;

corresponding point number determination part for determining whether the number of corresponding points found by the search using the corresponding point search part is equal to or more than a first threshold;

control part for controlling the corresponding point search part and the corresponding point number determination part for re-executing the corresponding point search and the corresponding point number determination, with respect to the first image data, using second new image data obtained by follow-up imaging only from a viewpoint different from the reference viewpoint, when the number of corresponding points is determined to be less than the first threshold by the corresponding point number determination part;

threshold reduction part for reducing the first threshold, when the second image data having the number of corresponding points equal to or more than the first threshold is not acquired in a predetermined period of time or at a point in time in which re-execution of the corresponding point search and the corresponding point number determination has been performed a predetermined number of times, and stereoscopic image file creation part for creating a stereoscopic image file, using the first image data and the second image data when the number of corresponding points is determined to be equal to or more than the first threshold by the corresponding point number determination part.

2. The stereoscopic image capture device according to claim 1, wherein imaging from the viewpoint different from the reference viewpoint, the corresponding point search and the corresponding point number determination are repeated until the second image data having the number of corresponding points equal to or more than the first threshold is obtained.

3. The stereoscopic image capture device according to claim 1, wherein the first threshold is set by a predetermined ratio to the number of pixels of a second image represented by the second image data.

4. The stereoscopic image capture device according to claim 1, further comprising parallax value calculation part for calculating a parallax value between the feature point and the corresponding point for each corresponding point found by the search using the corresponding point search part, wherein the corresponding point number determination part determines whether the number of corresponding points having a predetermined parallax value in the corresponding points found by the search using the corresponding point search part is equal to or more than a second threshold, proceeds to the creation of the stereoscopic image file, when the number of corresponding points having the predetermined parallax value is determined to be equal to or more than a second threshold, and proceeds to re-execution of the corresponding point search and the corresponding point number determination using second new image data, when the number of corresponding points having the predetermined parallax value is determined to be less than the second threshold.

5. The stereoscopic image capture device according to claim 4, wherein the corresponding point number determination part further determines whether the number of corresponding points having a parallax value equal to or more than a limit parallax value in the corresponding points found by the search using the corresponding point number search part is less than a third threshold, proceeds to the creation of the stereoscopic image file, when it is determined that the number of corresponding points having the predetermined parallax value is equal to or more than the second threshold, and the number of corresponding points having a parallax value equal to or more than the limit parallax value is less than the third threshold, and proceeds to the re-execution of the corresponding point search and the corresponding point number determination using the second new image data, when it is determined that the number of corresponding points having the predetermined parallax value is less than the second threshold or the number of corresponding points having a parallax value equal to or more than the limit parallax value is equal to or more than the third threshold.

6. The stereoscopic image capture device according to claim 4, wherein the second threshold is set by a predetermined ratio to the number of pixels of a second image represented by the second image data.

7. The stereoscopic image capture device according to claim 5, wherein the second and third thresholds is set by a predetermined ratio to the number of pixels of a second image represented by the second image data.

8. The stereoscopic image capture device according to claim 4, wherein the parallax value calculation part calculates the parallax value for each corresponding point by subtracting a coordinate value of the corresponding point corresponding to the feature point from a coordinate value of the feature point, and the corresponding point number determination part uses, in precedence, either of the corresponding point of which a positive parallax value is calculated or the corresponding point of which a negative parallax value is calculated.

9. The stereoscopic image capture device according to claim 1, further comprising area division part for dividing the second image represented by the second image data used in the corresponding point search using the corresponding point search part into a plurality of areas, wherein the corresponding point number determination part determines whether the number of corresponding points contained in each of the plurality of divided areas divided by the area division part is equal to or more than a fourth threshold.

10. The stereoscopic image capture device according to claim 9, wherein the fourth threshold is set by a predetermined ratio to the number of pixels constituting the divided area.

11. The stereoscopic image capture device according to claim 1, wherein when the number of corresponding points is determined to be less than the first threshold by the corresponding point number determination part, image data which is then obtained by capturing the subject from the viewpoint different from the reference viewpoint is used as the second new image data.

12. The stereoscopic image capture device according to claim 1, wherein when the number of corresponding points is determined to be less than the first threshold by the corresponding point number determination part, one second image data selected from among a plurality of second image data from the viewpoint different from the reference viewpoint obtained in advance by multiple times of imaging is used as the second new image data.

13. The stereoscopic image capture device according to claim 1, further comprising image flat area detection part for detecting an image flat area having a small change in luminance or a color, wherein the corresponding point search part sets remaining image areas except the image flat area detected by the image flat area detection part to a range of the corresponding point search.

14. The stereoscopic image capture device according to claim 1, wherein the corresponding point search part sets remaining image areas except predetermined areas on right and left ends of the second image to a range of the corresponding point search.

15. The stereoscopic image capture device according to claim 1, wherein image data obtained by moving image capture is used as the first image data and the second image data.

16. The stereoscopic image capture device according to claim 1, further comprising blind area determination part for determining whether a size of at least one blind area of a first blind area which is contained in a second subject image represented by the second image data but is not contained in a first subject image represented by the first image data and a second blind area which is contained in the first subject image but is not contained in the second subject image is equal to or more than a fifth threshold,
wherein the control part controls the corresponding point search part and the corresponding point number determination part for re-executing the corresponding point search and the corresponding point number determination, using second new image data obtained by follow-up imaging from the viewpoint different from the reference viewpoint when the size of at least one blind area of the first blind area and the second blind area is determined to be equal to or more than the fifth threshold by the blind area determination part, and
the stereoscopic image file creation part creates a stereoscopic image file, using the first image data and the second image data when the size of at least one blind area of the first blind area and the second blind area is determined to be less than the fifth threshold by the blind area determination part.

17. The stereoscopic image capture device according to claim 1, wherein the corresponding point number determination part determines whether the number of corresponding points having a predetermined parallax value of which an absolute value is less than a sixth threshold in the corresponding points found by the corresponding point search part is equal to or more than the first threshold.

18. The stereoscopic image capture device according to claim 4, further comprising main subject image detection part for detecting a main subject image from a second subject image represented by the second image data,
wherein the corresponding point search part searches for a corresponding point corresponding to each of a plurality of feature points detected using the first image data from the main subject image detected by the main subject image detection part.

19. A method of controlling a stereoscopic image capture device which includes imaging part for imaging a subject to output image data obtained by imaging, and generates a stereoscopic image file from image data indicating a subject image from a viewpoint for a left eye and a viewpoint for a right eye which are output from the imaging part, comprising:
causing corresponding point search part to search for a corresponding point corresponding to each of a plurality of feature points detected using first image data obtained from one reference viewpoint of the viewpoint for a left eye and the viewpoint for a right eye, using second image data obtained from the other viewpoint of the viewpoint for a left eye and the viewpoint for a right eye which is different from the reference viewpoint;
causing corresponding point number determination part to determine whether the number of corresponding points found by the search using the corresponding point search part is equal to or more than a first threshold;
causing control part to control the corresponding point search part and the corresponding point number determination part for re-executing the corresponding point search and the corresponding point number determination, with respect to the first image data, using second new image data obtained by follow-up imaging only from a viewpoint different from the reference viewpoint, when the number of corresponding points is determined to be less than the first threshold by the corresponding point number determination part;
causing threshold reduction part to reduce the first threshold, when the second image data having the number of corresponding points equal to or more than the first threshold is not acquired in a predetermined period of time or at a point in time in which re-execution of the corresponding point search and the corresponding point number determination has been performed a predetermined number of times, and
causing stereoscopic image file creation part to create a stereoscopic image file, using the first image data and the second image data when the number of corresponding points is determined to be equal to or more than the first threshold by the corresponding point number determination part.

20. The stereoscopic image capture device according to claim 1, wherein the plurality of feature points are set with angles or points of intersection between lines and the like of an object of the image, which the plurality of feature points are detected using first image data obtained from one reference viewpoint of the viewpoint for a left eye and the viewpoint for a right eye.

* * * * *